US012770628B2

(12) United States Patent
Tyagi et al.

(10) Patent No.: US 12,770,628 B2
(45) Date of Patent: Oct. 20, 2026

(54) METHODS, APPARATUS AND SYSTEMS FOR DIRECTIONAL AUDIO CODING-SPATIAL RECONSTRUCTION AUDIO PROCESSING

(71) Applicants: Dolby Laboratories Licensing Corporation, San Francisco, CA (US); DOLBY INTERNATIONAL AB, Dublin (IE)

(72) Inventors: Rishabh Tyagi, Sydney (AU); Juan Felix Torres, Redfern (AU); Stefan Bruhn, Sollentuna (SE); Stefanie Brown, Lewisham (AU)

(73) Assignees: DOLBY LABORATORIES LICENSING CORPORATION, San Francisco, CA (US); DOLBY INTERNATIONAL AB, Dublin (IE)

(*) Notice: Subject to any disclaimer, the term of this patent is extended or adjusted under 35 U.S.C. 154(b) by 91 days.

(21) Appl. No.: 18/845,405

(22) PCT Filed: Mar. 6, 2023

(86) PCT No.: PCT/US2023/063769
§ 371 (c)(1),
(2) Date: Sep. 9, 2024

(87) PCT Pub. No.: WO2023/172865
PCT Pub. Date: Sep. 14, 2023

(65) Prior Publication Data

US 2025/0210048 A1 Jun. 26, 2025

Related U.S. Application Data

(60) Provisional application No. 63/487,332, filed on Feb. 28, 2023, provisional application No. 63/358,314,
(Continued)

(51) Int. Cl.
*G10L 19/008* (2013.01)
*G10L 19/032* (2013.01)
*G10L 19/18* (2013.01)

(52) U.S. Cl.
CPC .......... *G10L 19/008* (2013.01); *G10L 19/032* (2013.01); *G10L 19/18* (2013.01)

(58) Field of Classification Search
CPC ...... G10L 19/008; G10L 19/032; G10L 19/18
See application file for complete search history.

(56) References Cited

U.S. PATENT DOCUMENTS

| | | | |
|---|---|---|---|
| 9,838,822 | B2 | 12/2017 | Boehm |
| 9,961,467 | B2 | 5/2018 | Kim |

(Continued)

FOREIGN PATENT DOCUMENTS

| | | | |
|---|---|---|---|
| RU | 2663345 | C2 | 8/2018 |
| WO | 2018162803 | A1 | 9/2018 |

(Continued)

OTHER PUBLICATIONS

Vilkamo, Juha, and Ville Pulkki. "Minimization of decorrelator artifacts in directional audio coding by covariance domain rendering." Journal of the Audio Engineering Society 61.9 (2013): 637-646. (Year: 2013).*

(Continued)

*Primary Examiner* — Bhavesh M Mehta
*Assistant Examiner* — Jangwoen Lee
(74) *Attorney, Agent, or Firm* — Fish & Richardson P.C.

(57) ABSTRACT

Enclosed are embodiments for audio processing that combines complementary aspects of Spatial Reconstruction (SPAR) and Directional Audio Coding (DirAC) technologies, including higher audio quality, reduced bitrate, input/output format flexibility and/or reduced computational com-
(Continued)

plexity, to produce a codec (e.g., an Ambisonics codec) that has better overall performance than DirAC or SPAR codecs.

2 Claims, 9 Drawing Sheets

Related U.S. Application Data filed on Jul. 5, 2022, provisional application No. 63/338,674, filed on May 5, 2022, provisional application No. 63/327,450, filed on Apr. 5, 2022, provisional application No. 63/323,201, filed on Mar. 24, 2022, provisional application No. 63/321,200, filed on Mar. 18, 2022, provisional application No. 63/319,485, filed on Mar. 14, 2022, provisional application No. 63/318,744, filed on Mar. 10, 2022.

(56) References Cited

U.S. PATENT DOCUMENTS

| | | | | |
|---|---|---|---|---|
| 9,978,385 | B2 | 5/2018 | Lars | |
| 11,259,137 | B2 | 2/2022 | Eronen | |
| 11,699,451 | B2 | 7/2023 | McGrath | |
| 2012/0057710 | A1 | 3/2012 | Disch | |
| 2014/0358558 | A1 | 12/2014 | Sen | |
| 2017/0180902 | A1 | 6/2017 | Kordon | |
| 2020/0221230 | A1 | 7/2020 | Fuchs | |
| 2020/0357421 | A1 | 11/2020 | Fuchs | |
| 2021/0166708 | A1* | 6/2021 | Mcgrath | G10L 19/167 |
| 2021/0210104 | A1* | 7/2021 | Laaksonen | G10L 19/008 |
| 2021/0289312 | A1 | 9/2021 | Fuchs | |
| 2021/0343300 | A1 | 11/2021 | Küch | |
| 2021/0375297 | A1 | 12/2021 | Bruhn et al. | |
| 2022/0022000 | A1 | 1/2022 | Bruhn | |
| 2025/0184682 | A1* | 6/2025 | Laitinen | H04S 7/302 |

FOREIGN PATENT DOCUMENTS

| | | | |
|---|---|---|---|
| WO | 2020089523 | A1 | 5/2020 |
| WO | 2020247033 | A1 | 12/2020 |
| WO | 2020249480 | A1 | 12/2020 |
| WO | 2020249815 | A2 | 12/2020 |
| WO | 2021/022087 | A1 | 2/2021 |
| WO | 2022022876 | A1 | 2/2022 |

OTHER PUBLICATIONS

Frank, M., et al., Producing 3D Audio in Ambisonics, AES 57th International Conference, Mar. 6-8, 2015, Hollywood, CA, 8 pages.

Fraunhofer IIS, Additional considerations on spatial metadata for an IVAS spatial audio input format, 3GPP TSG SA4#99 meeting, Jul. 9-13, 2018, Rome, Italy, 2 pages.

Mcgrath, D., et al., Immersive Audio Coding for Virtual Reality Using a Metadata-Assisted Extension of the 3GPP EVS Codec, ICASSP 2019-2019 IEEE International Conference on Acoustics, Speech and Signal Processing (ICASSP), IEEE, May 12, 2019, pp. 730-734, XP033566263, 5 pages.

Peters, N., et al., Scene-based Audio Implemented with Higher Order Ambisonics (HOA), SMPTE, vol. 125, No. 9, Dec. 2016.

Politis, A., et al., COMPASS: Coding and Multidirectional Parameterization of Ambisonic Sound Scenes, IEEE International Conference on Acoustics, Speech and Signal Processing (ICASSP), Apr. 15-20, 2018, p. 6802-6806, 5 pages.

Politis, A., et al., Enhancement of Ambisonic Binaural Reproduction Using Audio Coding With Optimal Adaptive Mixing, 2017 IEEE Workshop on Applications of Signal Processing to Audio and Acoustics (WASPAA), Oct. 15-18, 2017, New Paltz, NY, 5 pages.

Quackenbush, S., et al., MPEG Standards for Compressed Representation of Immersive Audio, Proceedings of the IEE, vol. 109, No. 9, Sep. 2021, p. 1578-1589, 12 pages.

* cited by examiner

METHODS, APPARATUS AND SYSTEMS FOR DIRECTIONAL AUDIO CODING-SPATIAL RECONSTRUCTION AUDIO PROCESSING

CROSS-REFERENCE TO RELATED APPLICATION PAPERS

This application is a U.S. National Stage application under U.S.C. 371 of International Application No. PCT/US2023/063769 filed Mar. 6, 2023, which claims the benefit of priority of U.S. Provisional Application No. 63/318,744 filed Mar. 10, 2022, U.S. Provisional Application No. 63/319,485 filed Mar. 14, 2022, U.S. Provisional Application No. 63/321,200 filed Mar. 18, 2022, U.S. Provisional Application No. 63/323,201 filed Mar. 24, 2022, U.S. Provisional Application No. 63/327,450 filed Apr. 5, 2022, U.S. Provisional Application No. 63/338,674 filed May 5, 2022, U.S. Provisional Application No. 63/358,314 filed Jul. 5, 2022, and U.S. Provisional Application No. 63/487,332 filed Feb. 28, 2023, each of which is hereby incorporated in its' entirety by reference.

TECHNICAL FIELD

This disclosure relates generally to audio processing.

1.0 BACKGROUND

Spatial Reconstruction (SPAR) and Directional Audio Coding (DirAC) are separate spatial audio coding technologies that each seek to represent an input spatial audio scene in a compact way to enable transmission with a good trade-off between audio quality and bitrate. One such input format for a spatial audio scene is an Ambisonics representation (e.g., first-order Ambisonics (FOA) or higher-order Ambisonics (HOA)).

SPAR seeks to maximize perceived audio quality while minimizing bitrate by reducing the energy of the transmitted audio data while still allowing the second-order statistics of the Ambisonics audio scene (i.e. the covariance) to be reconstructed at the decoder side using transmitted metadata. SPAR seeks to faithfully reconstruct the input Ambisonics scene at the output of the decoder.

DirAC is a technology which represents spatial audio scenes as a collection of directions of arrival (DOA) in time-frequency tiles. From this representation, a similar-sounding scene can be reproduced in a different output format (e.g., binaural). Notably, in the context of Ambisonics, the DirAC representation allows a decoder to produce higher-order output from low-order input (blind upmix). DirAC seeks to preserve direction and diffuseness of the dominant sounds in the input scene.

Both DirAC and SPAR have different strengths and properties. It is therefore desirable to combine the complementary aspects of DirAC and SPAR (e.g., higher audio quality, reduced bitrate, input/output format flexibility and/or reduced computational complexity) into a coder/decoder ("codec"), such as an Ambisonics codec.

1.1 Example IVAS Codec Framework

FIG. 1 is a block diagram of an immersive voice and audio services (IVAS) coder/decoder ("codec") framework 100 for encoding and decoding IVAS bitstreams, according to one or more implementations. IVAS is expected to support a range of audio service capabilities, including but not limited to mono to stereo upmixing and fully immersive audio encoding, decoding and rendering. IVAS is also intended to be supported by a wide range of devices, endpoints, and network nodes, including but not limited to: mobile and smart phones, electronic tablets, personal computers, conference phones, conference rooms, virtual reality (VR) and augmented reality (AR) devices, home theatre devices, and other suitable devices.

IVAS codec 100 includes IVAS encoder 101 and IVAS decoder 104. IVAS encoder 101 includes spatial encoder 102 that receives N channels of input spatial audio (e.g., FOA, HOA). In some implementations, spatial encoder 102 implements SPAR and DirAC for analyzing/downmixing N_dmx spatial audio channels, as described in further detail below. The output of spatial encoder 102 includes a spatial metadata (MD) bistream (BS) and N_dmx channels of spatial downmix. The spatial MD is quantized and entropy coded. In some implementations, quantization can include fine, moderate, coarse and extra coarse quantization strategies and entropy coding can include Huffman or Arithmetic coding. Core audio encoder 103 (e.g., a Enhanced Voice Services (EVS) encoding unit) encodes N_dmx channels (N=1-16 channels) of the spatial downmix into an audio bitstream, which is combined with the spatial MD bitstream into an IVAS encoded bitstream transmitted to IVAS decoder 104.

IVAS decoder 104 includes core audio decoder 105 (e.g., EVS decoder) that decodes the audio bitstream extracted from the IVAS bitstream to recover the N_dmx audio channels. Spatial decoder/renderer 106 (e.g., SPAR/DirAC) decodes the spatial MD bistream extracted from the IVAS bitstream to recover the spatial MD, and synthesizes/renders output audio channels using the spatial MD and a spatial upmix for playback on various audio systems with different speaker configurations and capabilities.

SUMMARY

Enclosed are embodiments for DirAC-SPAR audio processing.

In some embodiments, a method comprises: receiving, with at least one processor, a multi-channel audio signal comprising a first set of channels; for a first set of frequency bands:

computing, with the at least one processor, directional audio coding (DirAC) metadata from the first set of channels; quantizing, with the at least one processor, the DirAC metadata; encoding, with the at least one processor, the quantized DirAC metadata; converting, with the at least one processor, the quantized DirAC metadata into two or more parameters of a first spatial reconstruction (SPAR) metadata; for a second set of frequency bands that are lower than the first set of frequency bands: computing, with the at least one processor, a second SPAR metadata from the first set of channels; quantizing, with the at least one processor, the second SPAR metadata; encoding, with the at least one processor, the quantized second SPAR metadata; generating, with the at least one processor, a downmix based on the first SPAR metadata and the second SPAR metadata; computing, with the at least one processor, frequency coefficients from the first set of channels; downmixing, with the at least one processor, to a second set of channels from the coefficients and downmix; encoding, with the at least one processor, the second set of channels; and outputting a bitstream including the encoded second set of channels, the quantized and encoded second SPAR metadata and the quantized and encoded DirAC metadata.

In some embodiments, the first set of channels are first order Ambisonic (FOA) channels.

In some embodiments, one or more parameters in the first SPAR metadata for the first set of frequency bands are coded in a bitstream rather than converted from DirAC metadata.

In some embodiments, the first SPAR metadata parameters coded in the bitstream are computed from a combination of DirAC metadata and an input covariance of the first set of channels.

In some embodiments, the second set of channels includes a primary downmix channel, wherein the primary downmix channel is obtained by applying gains to the first set of channels and adding the gain-adjusted first set of channels together, wherein the gains are computed from the DirAC metadata, wherein the primary downmix channel is a representation of a dominant eigen signal for the first set of channels.

In some embodiments, a method comprises: receiving, with at least one processor, a multi-channel audio signal comprising a first set of channels and a second set of channels different than the first set of channels; for a first set of frequency bands: computing, with the at least one processor, directional audio coding (DirAC) metadata from the first set of channels; quantizing, with the at least one processor, the DirAC metadata; encoding, with the at least one processor, the quantized DirAC metadata; converting, with the at least one processor, the quantized DirAC metadata into two or more parameters of a first spatial reconstruction (SPAR) metadata; for a second set of frequency bands that are lower than the first set of frequency bands: computing, with the at least one processor, a second SPAR metadata from the first set of channels and the second set of channels; quantizing, with the at least one processor, the second SPAR metadata; encoding, with the at least one processor, the quantized second SPAR metadata; generating, with the at least one processor, a downmix based on the first SPAR metadata and the second SPAR metadata; computing, with the at least one processor, frequency coefficients from the first set of channels and the second set of channels; downmixing, with the at least one processor, to a third set of channels from the coefficients and downmix; encoding, with the at least one processor, the third set of channels; and outputting a bitstream including the encoded third set of channels, the quantized and encoded second SPAR metadata and the quantized and encoded DirAC metadata.

In some embodiments, two or more parameters in the first SPAR metadata are converted from DirAC metadata, and the second SPAR data is computed using an input covariance.

In some embodiments, one or more parameters in the first SPAR metadata for the first set of frequency bands are coded in a bitstream rather than converted from DirAC metadata.

In some embodiments, the first SPAR metadata parameters coded in the bitstream are computed from a combination of DirAC metadata and a covariance of the second set of channels.

In some embodiments, the first SPAR metadata parameters coded in the bitstream include prediction coefficients, cross-prediction coefficients and decorrelation coefficients for the second set of channels In some embodiments, the first set of channels are first order Ambisonic (FOA) channels and the second set of channels include at least one of planar or non-planar higher order Ambisonic (HOA) channels.

In some embodiments, the two or more parameters of the first SPAR metadata are converted from DirAC metadata and the second SPAR metadata is computed and coded for all frequency bands.

In some embodiments, the second SPAR metadata is computed from first and second sets of channels and the first SPAR metadata.

In some embodiments, the DirAC metadata is estimated based on the input covariance matrix.

In some embodiments, generating the SPAR metadata from DirAC metadata comprises: approximating a second input covariance from the DirAC metadata and spherical harmonics responses; and computing the two or more parameters in the SPAR metadata from the second input covariance.

In some embodiments, one or more elements of the second input covariance are generated using the DirAC metadata and decorrelation coefficients in the second SPAR metadata.

In some embodiments, one or more elements of the second input covariance are generated from DirAC metadata, such that the decorrelation coefficients in the SPAR metadata depend only on a diffuseness parameter in the DirAC metadata and normalization of Ambisonics input and one or more constants.

In some embodiments, the third set of channels includes a primary downmix channel, wherein the primary downmix channel is obtained by applying gains to the first set of channels and adding the gain-adjusted first set of channels together, wherein the gains are computed from the DirAC metadata, wherein the primary downmix channel is a representation of a dominant eigen signal for the first set of channels.

In some embodiments, the DirAC metadata includes a diffuseness parameter computed based on a reference power (E) and intensity (1) of the multichannel audio signal, wherein E and I are computed based on the input covariance.

In some embodiments, the first set of channels includes first order Ambisonic (FOA) channels, and computation of the reference power in the DirAC metadata ensures that the reference power is always greater than or equal to the variance of a W channel of the FOA channels.

In some embodiments, the downmix is energy compensated in the first set of frequency bands based on a ratio of a total variance of the first set of channels and a total variance as per the second input covariance generated using the DirAC metadata.

In some embodiments, a method comprises: receiving, with at least one processor, an encoded bitstream including encoded audio channels and metadata, the metadata including a first directional audio coding (DirAC) metadata associated with a first frequency band, and a first spatial reconstruction (SPAR) metadata associated with a second frequency band that is lower than the first frequency band; decoding, with the at least one processor, the first DirAC metadata and the first SPAR metadata; dequantizing, with the at least one processor, the decoded first DirAC metadata and the first SPAR metadata; for the first frequency band: converting, with the at least one processor, the dequantized first DirAC metadata into two or more parameters of a second SPAR metadata; mixing, with the at least one processor, the first and second SPAR metadata into a combined SPAR metadata; decoding, with the at least one processor, the encoded audio channels; reconstructing, with the at least one processor, downmix channels from the decoded audio channels; converting, with the at least one processor, the downmix channels into a frequency banded domain; generating, with the at least one processor, a SPAR upmix based on the combined SPAR metadata; upmixing, with the at least one processor, the downmix channels in the frequency banded domain to a first set of channels based on the SPAR upmix; estimating, with the at least one processor, a second DirAC metadata in the second frequency band from the first set of channels and zero or more parameters in the first SPAR metadata; upmixing, with the at least one processor, the first set of channels to a second set of channels in the frequency banded domain based on the first and the second DirAC metadata; and converting, with the at least one processor, the second set of channels from the frequency banded domain into a time domain.

In some embodiments, the downmix is converted into a frequency banded domain using a filterbank (complex Low Delay Filter Bank).

In some embodiments, the first set of channels includes first order Ambisonics (FOA) channels and zero or more higher order Ambisonics (HOA) channels.

In some embodiments, the HOA channels of the first set of channels include at least one of planar HOA channels or non-planar HOA channels.

In some embodiments, the bitstream includes a third SPAR metadata that corresponds to HOA channels of the first set of channels and the first frequency band.

In some embodiments, the DirAC metadata are estimated for a third set of frequency bands including the first set of frequency bands and the second set of frequency bands from first order Ambisonics (FOA) channels in the frequency banded domain.

In some embodiments, the DirAC metadata are estimated for a fourth set of frequency bands that is a subset of the second set of frequency bands from SPAR metadata and zero or more elements of a covariance generated using the downmix and the upmix in the fourth set of frequency bands.

In some embodiments, computation of the DirAC metadata from SPAR metadata for the fourth set of frequency bands comprises: computing direction of arrival angles in DirAC metadata from prediction coefficients in SPAR metadata only; and computing a diffuseness parameter in the DirAC metadata from prediction coefficients and zero or more decorrelation coefficients in the SPAR metadata and a scale factor.

In some embodiments, the encoded channels include first order Ambisonic channels, and upmixing the downmix channels to a first set of channels in the first frequency band comprises: computing an upmix scaling gain from the first DirAC metadata; and applying the upmix scaling gain to the primary downmix channel to obtain the W channel of the first set of channels in the first frequency band, wherein the primary downmix channel is a representation of a dominant eigen signal for the first set of channels.

In some embodiments, a non-transitory computer-readable storage medium storing instructions that, when executed by a computing apparatus, cause a computing apparatus to perform any of the preceding methods.

In some embodiments, a computing apparatus comprises: at least one processor; and memory storing instructions that, when executed by the at least one processor, cause the computing apparatus to perform any of the preceding methods.

Other embodiments disclosed herein are directed to a system, apparatus and computer-readable medium. The details of the disclosed embodiments are set forth in the accompanying drawings and the description below. Other features, objects and advantages are apparent from the description, drawings and claims.

Particular embodiments disclosed herein combine the complementary aspects of DirAC and SPAR technologies, including higher audio quality, reduced bitrate, input/output format flexibility and/or reduced computational complexity, to produce a codec (e.g., an Ambisonics codec) that has better overall performance than DirAC or SPAR codecs.

Figure 1:
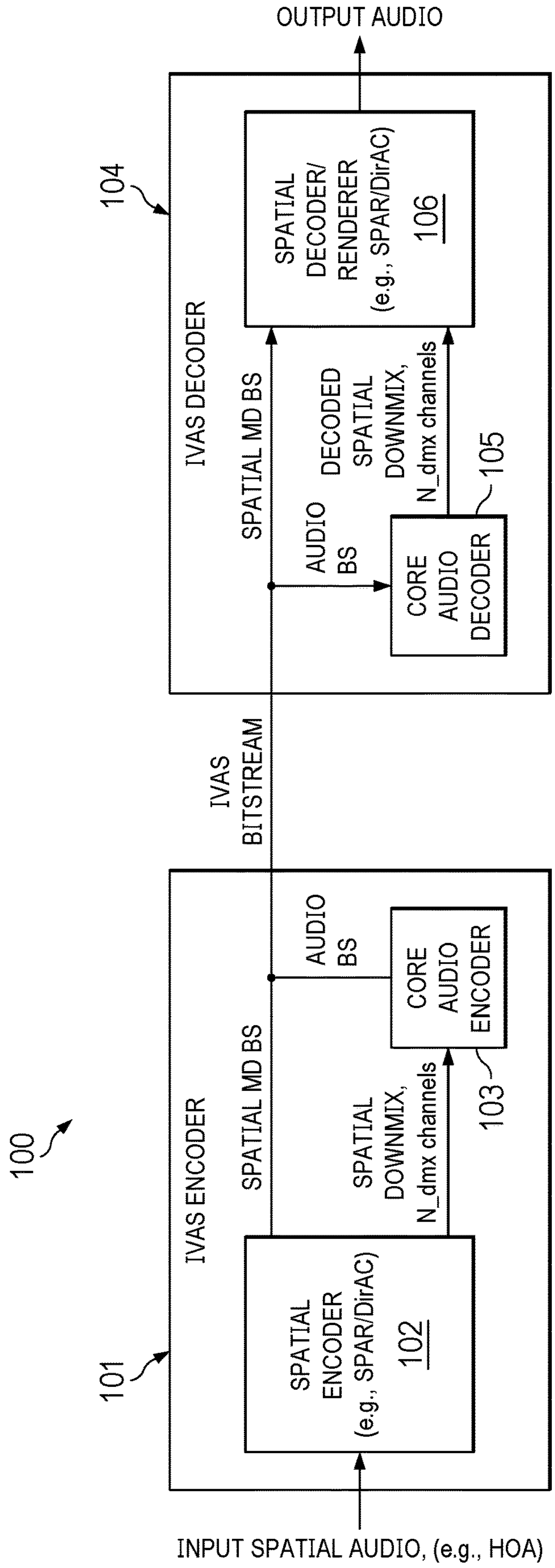
FIG. 1 is a block diagram of an IVAS codec framework, according to one or more embodiments.

In the drawings, specific arrangements or orderings of schematic elements, such as those representing devices, units, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some implementations.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths, as may be needed, to affect the communication.

The same reference symbol used in various drawings indicates like elements.

DETAILED DESCRIPTION

In the following detailed description, numerous specific details are set forth to provide a thorough understanding of the various described embodiments. It will be apparent to one of ordinary skill in the art that the various described implementations may be practiced without these specific details. In other instances, well-known methods, procedures, components, and circuits, have not been described in detail so as not to unnecessarily obscure aspects of the embodiments. Several features are described hereafter that can each be used independently of one another or with any combination of other features.

Nomenclature

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one other implementation." The terms "determined," "determines," or "determining" are to be read as obtaining, receiving, computing, calculating, estimating, predicting or deriving. In addition, in the following description and claims, unless defined otherwise, all technical and scientific terms used herein have the same meaning as commonly understood by one of ordinary skills in the art to which this disclosure belongs.

2.0 ALGORITHM ANALYSIS

As previously described, SPAR seeks to maximize perceived audio quality while minimizing bitrate by reducing the energy of the transmitted audio data while still allowing the second-order statistics of the Ambisonics audio scene (i.e. the covariance) to be reconstructed at the decoder side using transmitted metadata. DirAC seeks to preserve direction and diffuseness of the dominant sounds in the input scene. Summaries of DirAC and SPAR technologies are described below in sections 2.1 and 2.3, respectively.

2.1 DirAC Technology 2.1.1 Reference Paper

DirAC technology is described in V. Pulkki, "Directional Audio Coding in Spatial Sound Reproduction and Stereo Upmixing," in *Laboratory of Acoustics and Audio Signal Processing, Helsinki University of Technology*, Finland, 2006.

2.2 Example Implementation of DirAC Analysis in MDFT Domain 2.2.1 DirAC Analysis in MDFT Domain In an example implementation, the DirAC analysis block takes the time domain FOA channels of the ambisonics as an input and converts the FOA channels into frequency domain using Modified Discrete Fourier Transform (MDFT). Then, intensity and reference power is computed in the MDFT domain. Let $w_r$, $w_i$, $x_r$, $x_i$, $y_r$, $y_i$, $z_r$, $z_i$ be the real and imaginary bin samples of the W, X, Y and Z channels of the FOA component of the Ambisonics input in the MDFT domain, then the intensity corresponding to the frequency bin f of the channel X is computed as:

$$I(f)_x = w_r * x_r + w_i * x_i. \quad [1]$$

Similarly, intensity corresponding to Y and Z channels are computed.

The reference power computation E in frequency bin f is computed as:

$$E(f) = w_r * w_r + x_r * x_r + y_r * y_r + z_r * z_r. \quad [2]$$

The direction vector, dv, corresponding to X channel (or front-back direction) and frequency bin f is computed as $$dv(f)_x = \frac{I(f)_x}{I(f)_{norm}}, \quad [3]$$

where $$I(f)_{norm} = \sqrt{(I(f)_x^2 + I(f)_y^2 + I(f)_z^2)}. \quad [4]$$

Similarly, direction vector, dv, corresponding to Y channel (or left-right direction) and Z channel (or top-bottom direction) are computed.

2.2.2 DirAC Parameter Estimation in Banded Domain

The intensity, reference power and direction vector per bin are then converted to the banded domain by applying the absolute response of a filterbank to the above computed values in [1], [2] and [3]. Let the banded intensity, reference power and direction vector in a particular frequency band be $I_s$, E, $dv_s$, respectively, where s can be x, y or z.

2.2.2.1 DoA Angles (Azimuth and Elevation Angles) Computation

The azimuth and elevation of the dominant sound source within the scene for a particular time-frequency tile are computed in degrees as:

$$Az = \arctan\left(\frac{dv_y}{dv_x}\right) * \frac{180}{\pi} \quad [5]$$

$$El = \arctan\left(\frac{dv_z}{\sqrt{dv_x^2 + dv_y^2}}\right) * \frac{180}{\pi}. \quad [6]$$

2.2.2.2 Diffuseness and Energy Ratio Computation

For diffuseness, long-term averaging of E and I is computed over N frames or M subframes. In an example implementation, a frame represents 20 ms of audio data and a subframe represents 5 ms of audio data and the long-term averaging of E and I is done over 160 ms of audio data, i.e., 8 frames or 32 subframes. Let the long-term average be $I_{slow,s}$, $E_{slow}$, then the diffuseness is given as $$\text{Diffuseness} = \psi = 1 - \frac{\sqrt{(I_{slow,x}^2 + I_{slow,y}^2 + I_{slow,z}^2)}}{E_{slow}}, \quad [7]$$

$$\psi = \max(0, \min(1, \psi)), \quad [8]$$

$$\text{Energy ratio} = 1 - \psi. \quad [9]$$

The DirAC metadata parameters, i.e., DoA angles and diffuseness parameter, are quantized and coded by a metadata quantization and coding block. Based on the available bitrate, DirAC chooses N_dmx audio channels (also referred to as N_dmx downmix channels) out of N channel input, here N_dmx<=N and one of the channels in the N_dmx downmix channels is the W channel of the Ambisonics input to be coded by a core coder. Core coder bits and DirAC metadata bits are multiplexed into a bitstream and transmitted to a decoder. The decoder decodes the bitstream and reconstructs N_dmx downmix channels using a core decoder and DirAC metadata parameters using a metadata unquantization and decoding block. The N_dmx downmix channels and DirAC metadata parameters are fed into a DirAC synthesis and rendering block. The DirAC synthesis and rendering block computes the directional component of the output spatial audio scene using the W channel and spherical harmonics as per DoA angles. The DirAC synthesis and rendering block also computes the diffused component of the output spatial audio scene using a decorrelated version of the W channel, which is generated using a decorrelator block, and the diffuseness parameter in the DirAC metadata. The N_dmx downmix channels and directional and diffused components are then used to output the desired audio output format.

2.3 Example Implementation of SPAR (Spatial Reconstruction) with FOA Input

SPAR is a technology for efficient coding of spatial audio input. SPAR takes a multi-channel input and generates spatial metadata and a downmix signal such that the combination of spatial metadata and downmix signal can be coded with higher coding efficiency compared to coding each channel of the multi-channel input separately. SPAR aims to reproduce the covariance of an N channel multi-channel input and computes the spatial metadata and N_dmx channel downmix signal (where N_dmx<=N) based on the parameterized input covariance. The spatial metadata and downmix is quantized, coded and sent to the decoder. The decoder decodes the bitstream and unquantizes the spatial metadata and reconstructs downmix signal. The decoder then utilizes the spatial metadata and downmix and zero or more decorrelator(s) to reconstruct the multi-channel input audio scene. Example implementations of SPAR are further described in in PCT Patent Application No. PCT/US2023/010415, filed on Jan. 9, 2023, for "Spatial Coding Of Higher Order Ambisonics For A Low Latency Immersive Audio CODEC."

2.3.1 First Order Ambisonics (FOA) Input

With FOA input, consisting of channels W, Y, Z, X (in the ACN channel ordering convention), SPAR downmix signals can vary from 1 to 4 channels and the spatial metadata parameters include prediction parameters PR, cross-prediction parameters C, and decorrelation parameters P. These parameters are calculated from a covariance matrix of a windowed input audio signal and are calculated in a specified number of frequency bands (e.g., 12 frequency bands). An example representation of SPAR parameters extraction is described below.

2.3.1.1 Side Signal Prediction

Predict all side signals (Y, Z, X) from the primary audio signal W and compute the prediction coefficients for the residual channels using Equation [11]:

$$\begin{bmatrix} W \\ Y' \\ Z' \\ X' \end{bmatrix} = \begin{bmatrix} 1 & 0 & 0 & 0 \\ -pr_Y & 1 & 0 & 0 \\ -pr_Z & 0 & 1 & 0 \\ -pr_X & 0 & 0 & 1 \end{bmatrix} \begin{bmatrix} W \\ Y \\ Z \\ X \end{bmatrix} \quad [10]$$

where, as an example, the prediction coefficient for the residual channel Y' is calculated as shown in Equation [11]:

$$pr_Y = \frac{R_{YW}}{\max\left(R_{WW}, \sqrt{|R_{WY}|^2 + |R_{WZ}|^2 + |R_{WX}|^2}, \epsilon\right)}, \quad [11]$$

and $R_{YW}$=cov (Y, W) are elements of the input covariance matrix corresponding to channels Y and W. Similarly, the Z' and X' residual channels have corresponding parameters $pr_Z$ and $pr_X$. PR is the vector of the predictions coefficients $PR=[pr_Y, pr_Z, pr_X]^T$.

The above mentioned downmixing is also referred to as passive W downmixing in which W does not get changed during the downmix process. Another way of downmixing is active W downmixing which allows some mixing of Y, X and Z channels into the W channel as follows:

$$W' = W + F_Y * Y + F_Z * Z + F_X * X, \quad [12]$$

where $F_Y$ is computed as a function of normalized input covariance $R_{YW}$ as $F_Y$=

$$F_Y = \frac{f * R_{YW}}{\max(m * R_{ww}, (R_{YY} + R_{XX} + R_{ZZ}))},$$

here f and m are constants (e.g., f=0.50, m=3) and similarly $F_X$ and $F_Z$ are computed as well. In some embodiments, $F_Y$, $F_X$, $F_Z$ are computed as a function of active prediction coefficients as $F_Y=f*pr_Y$, $F_X=f*pr_X$, $F_Z=f*pr_Z$, here, $pr_Y$, $pr_X$, $pr_Z$ are the active downmixing prediction coefficients and f is a constant (e.g., 0.50). In passive W, f=0 so there is no mixing of X, Y, Z channels into the W channel and W' W.

2.3.1.2 W Channel and Predicted Channels (Y', Z', X') Remixed

The W channel and predicted channels (Y', Z', X') are remixed from most to least acoustically relevant, where remixing includes reordering or recombining channels based on some methodology, as shown in Equation [13]:

$$\begin{bmatrix} W \\ A' \\ B' \\ C' \end{bmatrix} = [\text{remix}] \begin{bmatrix} W \\ Y' \\ Z' \\ X' \end{bmatrix}. \quad [13]$$

Note that one embodiment of remixing could be reordering of the input channels to W', Y', X', Z', given the assumption that audio cues from left and right are more important than front to back, and lastly up and down cues.

2.3.1.3 Post Prediction Covariance Computation

The covariance of the 4-channel post-prediction and remixing downmix are computed as shown in Equations [14] and [15]:

$$R_{pr} = [\text{remix}][\text{predict}] \cdot R \cdot [\text{predict}]^H [\text{remix}]^H, \quad [14]$$

$$R_{pr} = \begin{bmatrix} R_{WW} & R_{Wd} & R_{Wu} \\ R_{dW} & R_{dd} & R_{du} \\ R_{uW} & R_{ud} & R_{uu} \end{bmatrix}, \quad [15]$$

where dd represents the extra downmix channels beyond W (e.g., the $2^{nd}$ to N-dmx$^{th}$ channels), and u represents the channels that need to be wholly regenerated (e.g., $(N\_dmx+1)^{th}$ to 4 channels).

For the example of a WABC downmix ith 1-4 downmix channels, d and u represent the following channels, where the placeholder variables A, B, C can be any combination of X, Y, Z channels in FOA):

TABLE I

| N | Residual Channels | Predicted Channels |
|---|---|---|
| 1 | — | A', B', C' |
| 2 | A' | B', C' |
| 3 | A', B' | C' |
| 4 | A', B', C' | — |

2.3.1.4 Extra C Coefficients

From these calculations, it is determined if it is possible to cross-predict any remaining portion of the fully parametric channels from the residual channels being sent. The required extra C coefficients are:

$$C = R_{ud}(R_{dd} + I max(\epsilon, tr(R_{dd}) * 0.005))^{-1}. \quad [16]$$

Therefore, C has the shape (1×2) for a 3-channel downmix, and (2×1) for a 2-channel downmix. One embodiment of spatial noise filling does not require these C parameters and these parameters can be set to 0. An alternate embodiment of spatial noise filling may also include C parameters.

2.3.1.5 Remaining Energy in Parameterized Channels

The remaining energy in parameterized channels that must be filled by decorrelators is calculated. The residual energy in the upmix channels $Res_{uu}$ is the difference between the actual energy $R_{uu}$(post-prediction) and the regenerated cross-prediction energy $Reg_{uu}$:

$$Reg_{uu} = CR_{dd}C^H, \quad [17]$$

$$Res_{uu} = R_{uu} - Reg_{uu}, \quad [18]$$

$$NRes_{uu} = \frac{Res_{uu}}{\max(\varepsilon, Rww, \text{scale} * tr(|Res_{uu}|))}, \quad [19]$$

$$R = \text{diag}(\sqrt{\max(0, \text{real}(\text{diag}(NRes_{uu})))}), \quad [20]$$

where scale is a normalization scaling factor. Scale can be a broadband value (e.g., scale=0.01) or frequency dependent, and may take a different value in different frequency bands (e.g., scale=linspace (0.5, 0.01, 12) when the spectrum is divided into 12 bands).

2.4 Merging DirAC and SPAR

As stated previously, both DirAC and SPAR have different strengths and properties, and it is desired to combine the complementary aspects of each technology to produce a merged system that is advantageous in one or more of the following dimensions: higher audio quality, reduced bitrate, input/output format flexibility and/or reduced computational complexity. Some of the embodiments to efficiently merge these two technologies are listed below.

2.4.1 Frequency Based SPAR-DirAC Split

It has been observed that coding lower frequency bands with SPAR and higher frequency bands with DirAC improves the coding efficiency and quality at the decoder while reconstructing the spatial audio scene. It may also be desirable to code low frequency bands with SPAR to reconstruct an input covariance at the output, or to code higher frequency bands with DirAC, with the same, or finer, time resolution, to perform efficient upmix of SPAR reconstructed FoA signals to HOA.

At the encoder, a first embodiment: 1) uses a filterbank to convert time domain broadband Ambisonics input into a frequency banded domain; 2) performs DirAC analysis in high frequency bands and obtains DirAC MD parameters in high frequency bands; 3) performs SPAR analysis in low frequency bands and obtains SPAR MD parameters in low frequency bands; 4) obtains SPAR MD parameters in high frequency bands by converting DirAC MD parameters into SPAR MD using a MD conversion routine (D2S) (mentioned in sections 2.5 to 3.4); 5) generates a downmix matrix from SPAR MD and applying the downmix matrix to input channels obtains downmix channels as mentioned in section 2.3; 6) quantizes and encodes the SPAR MD parameters in low frequency bands and DirAC MD parameters in high frequency bands; 7) encodes downmix channels using a core audio coder; and 8) multiplexes MD bits and core coder bits into a bitstream and transmits the bitstream to a decoder.

At the decoder, a second embodiment: 1) obtains MD bits and core coder bits from the bitstream; 2) decodes the downmix channels using a core audio decoder; 3) decodes and unquantizes the low frequency SPAR MD parameters and the high frequency DirAC MD parameters from the MD bits; 4) obtains high frequency band SPAR MD from DirAC MD using a D2S conversion routine; 5) performs filter bank analysis on the decoded downmix channels; 6) generates a SPAR upmix in the filterbank domain using the SPAR MD in all frequency bands; and 7) generates spatial audio output at the decoder. In some embodiments, as part of step 7), filterbank synthesis is done on SPAR upmixed channels to reconstruct Ambisonics channels at the decoder. In some other embodiments, as part of step 7), DirAC analysis is done on the upmix channels generated by SPAR, obtaining DirAC MD parameters in all frequency bands and performing a DirAC upmix to a desired output format including but not limited to HOA2/HOA3.

At the decoder, a third embodiment: 1) obtains MD bits and core coder bits from the bitstream; 2) decodes downmix channels using a core audio decoder; 3) decodes and unquantizes the low frequency SPAR MD parameters and the high frequency DirAC MD parameters from MD bits; 4) obtains high frequency band SPAR metadata (MD) from DirAC MD using a D2S conversion routine and low frequency band DirAC MD from the SPAR MD and/or the downmix covariance using a SPAR to DiRAC (S2D) MD conversion routine (mentioned in section 3.4); 5) performs filterbank analysis on the decoded downmix channels; 6) generates a SPAR upmix in filterbank domain using SPAR MD in all frequency bands; and 7) generates spatial audio output at the decoder. In some embodiments, as part of step 7), filterbank synthesis is done on SPAR upmixed channels to reconstruct Ambisonics channels at the decoder. In some other embodiments, as part of step 7), DirAC MD parameters in all frequency bands, including the low frequency DirAC MD obtained in step 4) are applied to the SPAR upmix to perform a DirAC upmix to desired output format including but not limited to HOA2/HOA3.

2.4.2 Channel Based SPAR-DirAC Split (Same Processing in all Bands)

In some embodiments, a subset of Ambisonics input channels may be reconstructed via SPAR (either residually or parametrically), and some channels are reconstructed by DirAC. Any further upmix to a higher order is also handled by DirAC. SPAR reconstructs at least enough channels for DirAC analysis to be performed in the decoder, where generally DirAC analysis requires FOA channels (or planar FOA channels for the planar case). As used herein, residual coding is direct audio coding of the residual from which the output channel is reconstructed along with the predicted component from W, and parametric coding is coding of cross-prediciton and decorrelation parameters from which the output is reconstructed, along with the predicted component from W and the cross-predicted component of residuals and decorrelated version of W.

SPAR generally operates with a B-format representation of input and output Ambisonics audio. DirAC, in some cases, reconstructs the audio signal in A-format or Equivalent Spatial Domain (ESD), and in other cases, in B-format. The description that follows addresses mainly the latter B-format case. However, analogous embodiments are possible for DirAC synthesis in A-format or ESD. To that end, the SPAR reconstructed B-format channels may be used to generate a relatively sparse set of DirAC prototype signals in B-, A-format or ESD from which DirAC synthesis generates a denser set of upmix signals, where each of the upmix signals may drive a speaker of a multi-loudspeaker system. Such a multi-loudspeaker system may correspond to a real loudspeaker setup like, e.g., 7.1.4 or 5.1 or a virtual loudspeaker system which is an intermediate step to immersive binaural rendering of the synthesized audio signal.

Various embodiments of the above are described and tabulated in Table II below.

TABLE II

| Ambisonics input | SPAR Reconstruction Channels | DirAC Reconstruction Channels | DirAC Blind Upmix Channels |
|---|---|---|---|
| HOA3 | FOA | All $2^{nd}$ + $3^{rd}$ order | N/A |
| | FOA + $2^{nd}$ order planar | $2^{nd}$ order heights + all $3^{rd}$ order | N/A |
| | FOA + $2^{nd}$ and $3^{rd}$ order planar | $2^{nd}$ and $3^{rd}$ order heights | N/A |
| HOA2 | FOA | All $2^{nd}$ order | All $3^{rd}$ order |
| | FOA + $2^{nd}$ order planar | $2^{nd}$ order heights | All $3^{rd}$ order |
| Planar HOA N > 1 | Planar channels, all orders up to n < N | Planar channels, orders n < m <= N | Planar channels, orders N < p <= 3 |
| FOA, n_dmx = 4 | FOA | N/A | All $2^{nd}$ and/or $3^{rd}$ order |
| FOA, n_dmx < 4 | FOA | N/A | All $2^{nd}$ and/or $3^{rd}$ order |
| | Planar FOA | Z | All $2^{nd}$ and/or $3^{rd}$ order |
| Planar FOA, n_dmx = 3 | Planar FOA | N/A | Planar $2^{nd}$ and/or $3^{rd}$ order |
| Planar FOA, n_dmx < 3 | W, Y | X | Planar $2^{nd}$ and/or $3^{rd}$ order |

For HOA3 input, channels are reconstructed according to the following options: FOA, or HOA2, or FOA+$2^{nd}$ order planar channel, or FOA+$2^{nd}$+$3^{rd}$ order planar channels are reconstructed with SPAR, while the HOA2 and HOA3, or HOA3, or $2^{nd}$ order height and HOA3, or $2^{nd}$ and $3^{rd}$ order height channels are reconstructed using DirAC to reduce computational complexity without compromising the quality.

For FOA input, bitrates where SPAR has less than 4 downmix channels: 1) FOA with SPAR is implemented with a DirAC blind upmix to HOA2/HOA3, or 2) planar FOA with SPAR, a DirAC upmix to full FOA, with possible blind upmix HOA2/HOA3 with DirAC.

For FOA input, bitrates where SPAR has 4 downmix channels: 1) FOA with SPAR is implemented with a blind upmix to HOA2/HOA3 with DirAC.

For planar FOA input, bitrates where SPAR has less than 3 downmix channels, WY reconstruction with SPAR is implemented, along with an upmix to planar FOA, with possible blind upmix to planar HOA2/HOA3 with DirAC.

For planar FOA input, bitrates where SPAR has 3 downmix channels, WYX reconstruction with SPAR is implemented with a blind upmix to planar HOA2/HOA3 with DirAC.

2.4.3 Reconstruction of Individual Channels in Part by SPAR and by DirAC

In conjunction with the channel based SPAR-DirAC split technique disclosed in section 2.4.2, a further category of channel could be introduced that is parametrically reconstructed in part from both SPAR and DirAC methods. The motivation for this is to reduce reliance on large numbers of decorrelator outputs at the decoder, which could reduce mixing complexity figures. This approach uses SPAR prediction and cross-prediction to reconstruct the majority of a particular parametrically reconstructed signal, and then relies on DirAC diffuseness to restore any missing covariance.

2.4.4 Alternative Method to Reduce Usage of Decorrelators in Decoder

Instead of adding decorrelation in proportion with the decorrelation coefficients, in this embodiment energy matching of the cross-/prediction parametrically constructed channel is achieved by applying a gain derived from the SPAR coefficients. A particular Ambisonics signal S can be parametrically reconstructed as follows:

$$\textit{SPAR}\text{ Reconstructed } S = pr_s W + \sum_{r=1}^{N_{dmx}-1} C_{rs} R'_r + P_s * w(W) \quad [21]$$

$$\text{Prediction only } \tilde{S} = pr_s W + \sum_{r=1}^{N_{dmx}-1} C_{rs} R'_r \quad [22]$$

where $pr_s$, $C_{rs}$, and $P_S$ are the prediction, cross-prediction and decorrelation coefficients associated with S, and residual signal R (e.g. Y', Z', X', . . . ).

Gain Adjusted S=$g_s\tilde{S}$, where $$g_s = \sqrt{\frac{(|pr_s|^2 + |P_s|^2)W^2 + \sum_{r=1}^{N_{dmx}-1} |C_{rs}|^2 |R'_r|^2}{|pr_s|^2 W^2 + \sum_{r=1}^{N_{dmx}-1} |C_{rs}|^2 |R'_r|^2}}. \quad [23]$$

2.4.5 Frequency Based and Channel Based Split Combined

In some embodiments, sections 2.4.1 and 2.4.2 are combined to get the benefit of merging SPAR and DirAC by doing a combination of frequency based split and channel based split. In an example implementation, input to merged SPAR-DirAC system is an N channel Ambisonics signal. Out of these N channels, M channels are fed into a SPAR subsystem, where M<=N. In an embodiment, these M channels contain FoA channels. In some other embodiments, these M channels include FOA and planar HOA channels. SPAR can then operate in any downmix configuration based on the operating bitrate, where the number of downmix channels $N_{dmx}$ is such that $1<=N_{dmx}<=M$. For low frequencies, SPAR computes SPAR parameters including prediction, cross-prediction and decorrelation parameters based on methods described in section 2.3, whereas for higher frequencies DirAC parameters are computed as described in section 2.2, and SPAR parameters are estimated from DirAC parameters as described in sections 2.5 to 3.4 below. In some embodiments, SPAR computes SPAR parameters for high frequencies as well for a subset of input channels based on methods described in section 2.3.

The M channels reconstructed by SPAR on decoder side are then used by DirAC to reconstruct a representation of original N channel input scene.

Example implementations of a combined frequency based and channel-based split with HOA3 input to a SPAR-DirAC merged system are given below.

2.4.5.1 Example Encoder Embodiment 1

Figure 2:
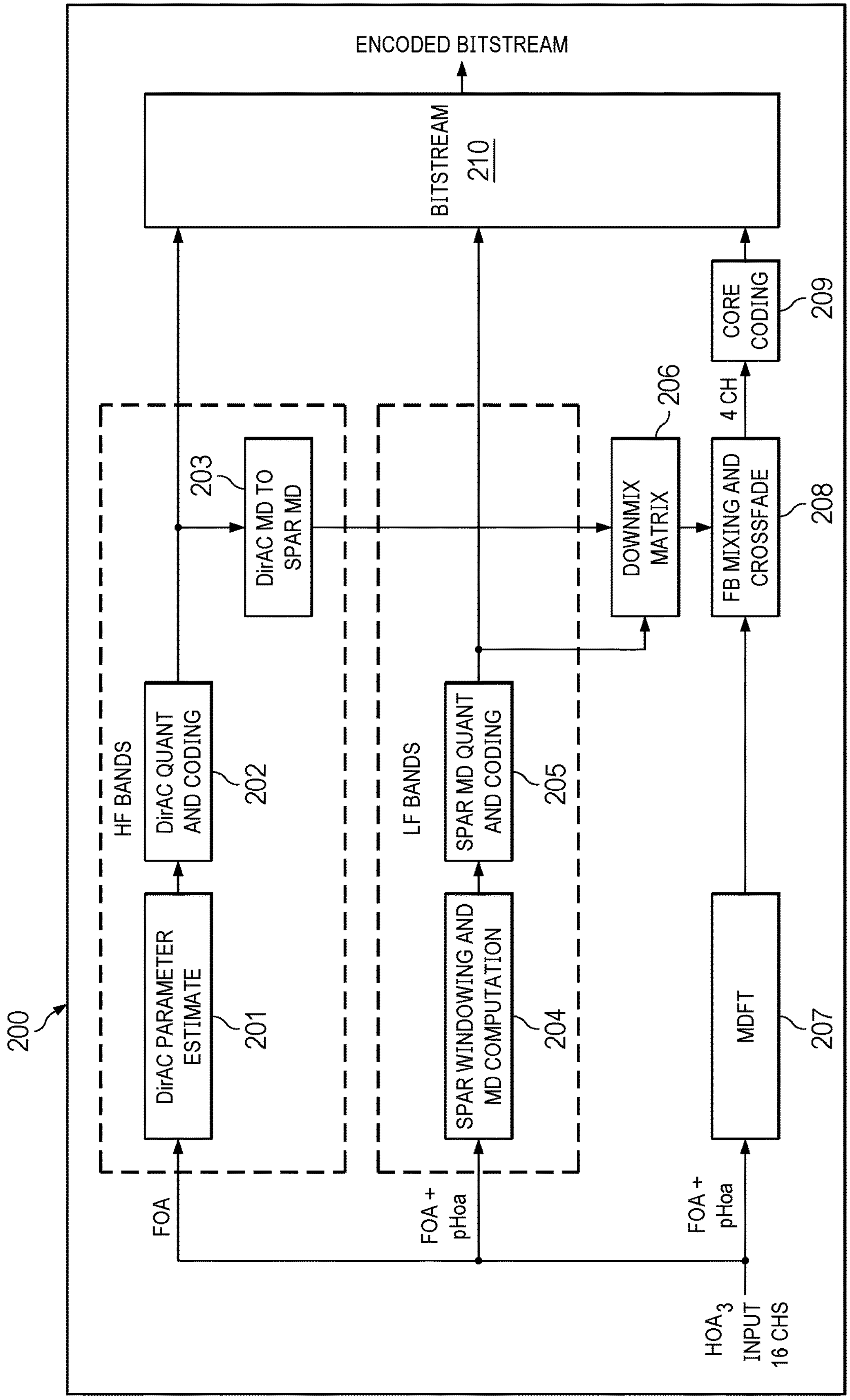
FIG. 2 is a block diagram of an encoder implementation with frequency-based and channel-based split between SPAR and DirAC, according to one or more embodiments.

FIG. 2 is a block diagram of an encoder 200 with frequency-based and channel-based split between SPAR and DirAC, according to one or more embodiments. In this embodiment, SPAR is operating in 4 channel downmix mode. Input into encoder 200 is a HOA3 ($3^{rd}$ Order Ambisonics) signal. DirAC parameter estimator 201 estimates the DirAC parameters which are limited to high frequencies and computed as per section 2.2 based on FOA channels in the Ambisonics input. The estimated DirAC parameters are quantized and coded 202 and the quantized DirAC MD are converted 203 to SPAR MD.

SPAR analysis and metadata computation 204 is based on FOA, planar HOA2 and planar HOA3 channels in the low frequencies as per section 2.3. The SPAR metadata is quantized and coded 205 and the quantized SPAR metadata in low frequencies and SPAR MD obtained from DirAC MD in high frequencies is converted into a downmix matrix 206. An MDFT transform 207 is applied to the FOA, planar HOA2 and planar HOA3 signals. The MDFT coefficients and downmix matrix are frequency band mixed with cross-fades using a filterbank mixer 208 to generate a 4-channel downmix. The 4-channel downmix is coded by one or more core codecs 209 (e.g., Enhanced Voice Services (EVS) encoder). The SPAR metadata coded in low frequencies and the DirAC metadata coded in high frequencies are packed together with the core codec coded bits to form final bitstream 210 output by encoder 200.

Encoder 200 is one example embodiment of an encoder that combines DirAC and SPAR. In other embodiments, SPAR and DirAC are combined by only frequency splitting or by only channel splitting.

2.4.5.1.2 Example Decoder Embodiment 1

Figure 3:
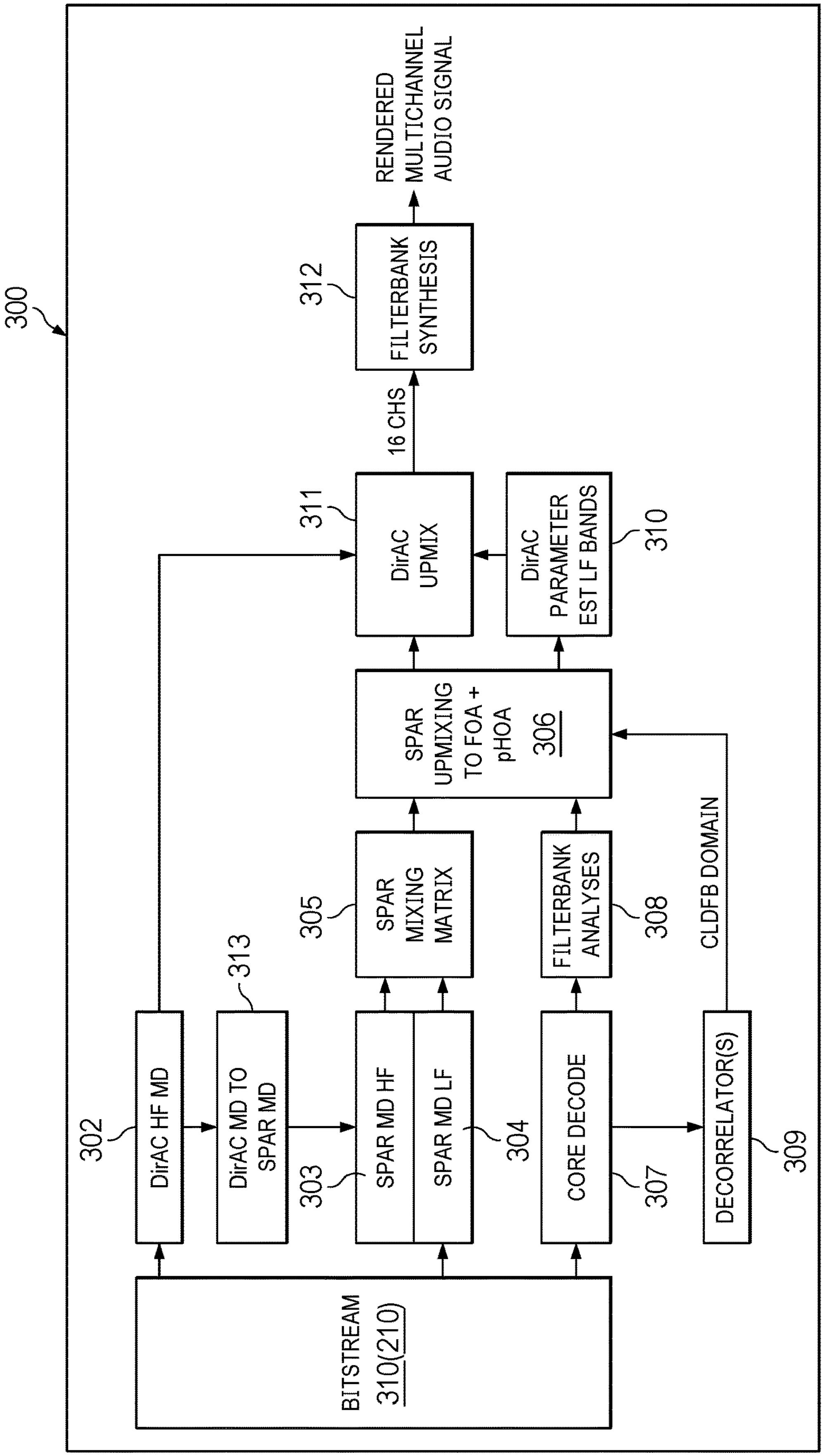
FIG. 3 is a block diagram of a decoder implementation with frequency-based and channel-based split between SPAR and DirAC, according to one or more embodiments.

FIG. 3 is a block diagram of decoder 300 with frequency-based and channel-based split between SPAR and DirAC, according to one or more embodiments. In this embodiment, decoder 300 receives bitstream 301(210) and provides the core codec encoded bits to one or more core codec decoder(s) 307 (e.g., EVS decoder(s)). DirAC MD 302 in the high frequencies is decoded and then converted to SPAR MD 303 in the high frequencies using DirAC MD to SPAR MD conversion 313, in an embodiment 313 at the decoder is same as 203 at the encoder. SPAR MD in the bitstream is decoded to reconstruct SPAR metadata 304 in low frequencies. A SPAR upmix matrix 305 is generated using the low frequency SPAR metadata 304 extracted from bitstream 310 and the high frequency SPAR metadata 303 converted from the high frequency DirAC metadata. The downmix channels are reconstructed by one or more instances of core decoders 307 and converted into a frequency banded domain by filterbank 308 (e.g., CLDFB filterbank, Quadrature Mirror filterbank (QMF), etc.).

In some embodiments, the primary downmix channels are input into decorrelator(s) 309 and the outputs of decorrelator(s) 309 are input together with the upmix matrix into SPAR upmixing unit 306 to reconstruct the FOA, planar HOA2 and planar HOA3 channels. The decorrelation can be implemented in the time domain or frequency banded domain (e.g., CLDFB domain). The decorrelator(s) may either generate time domain decorrelated output and then convert it into frequency banded domain, or convert input into frequency banded domain and generate decorrelated outputs in frequency banded domain. The output channels of 306 are fed into DirAC parameter estimator 310, which estimates the DirAC metadata in low frequencies based on the reconstructed FOA signal in the frequency banded domain. DirAC upmixer 311 uses the low frequency DirAC metadata and the high frequency DirAC metadata to upmix the FOA, planar HOA2 and planar HOA3 channels into the 16 HOA3 channels, which is a frequency banded domain representation of the original 16 channel HOA3 input to encoder 200. Synthesizer 312 (e.g., CLDFB synthesizer) synthesizes/renders the 16 channel HOA3 frequency banded domain representation into the time domain representation for playback on various audio systems with different speaker configurations and capabilities.

2.4.5.2.1 EXAMPLE Encoder Embodiment 2

Figure 4:
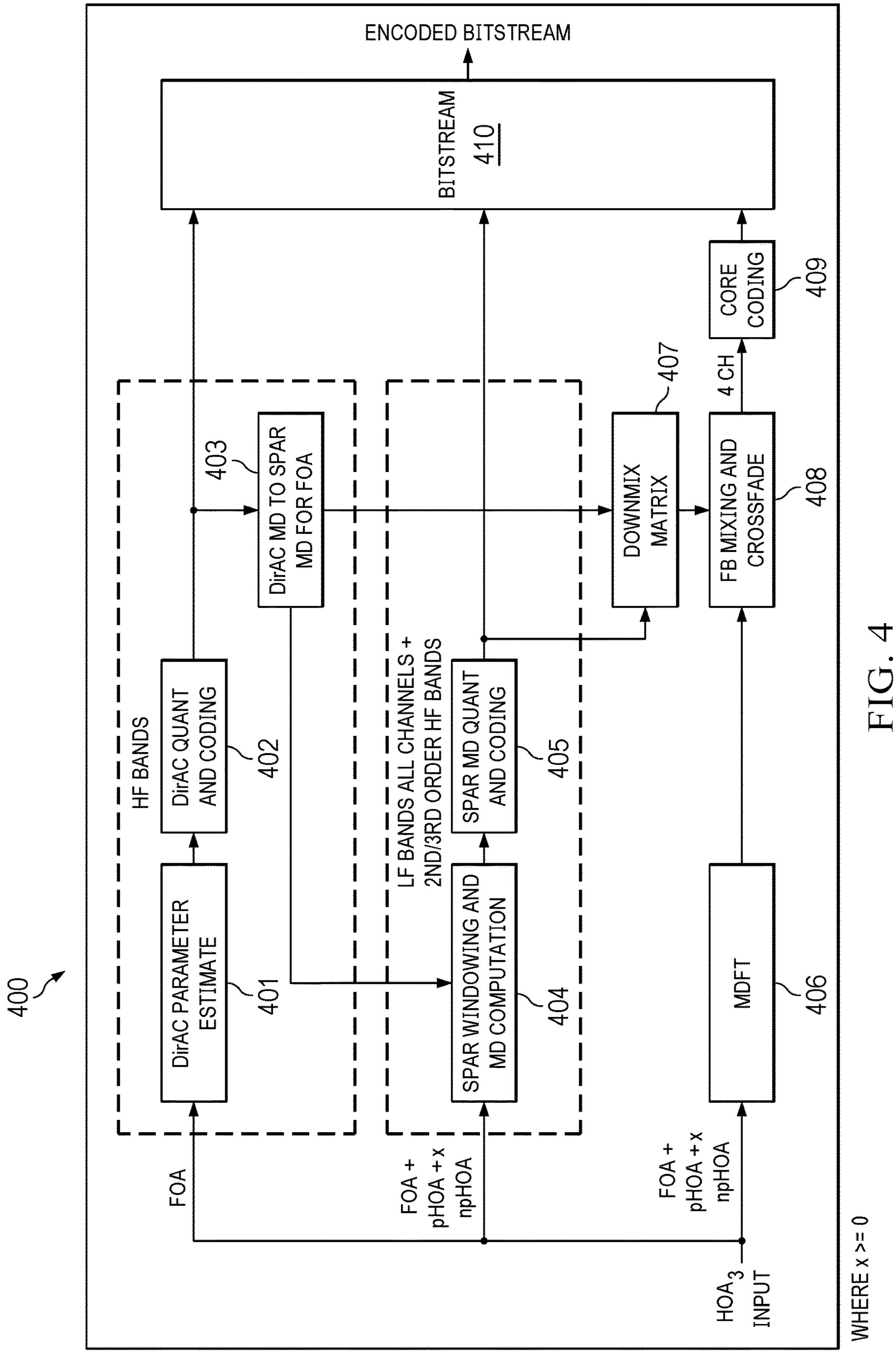
FIG. 4 is a block diagram of an alternate encoder implementation with frequency-based and channel-based split between SPAR and DirAC, according to one or more embodiments.

FIG. 4 is a block diagram of an alternate encoder 400 with frequency-based and channel-based split between SPAR and DirAC, according to one or more embodiments. In this embodiment, input into encoder 400 is an HOA3 signal. The DirAC parameters are estimated 401 and quantized and coded 402. The DirAC parameter estimation is limited to high frequencies and is done as per section 2.2 based on FOA channels. The SPAR analyses and metadata computation 404 and quantization and coding 405 is done in the low frequencies based on FOA, planar HOA2 and HOA3 channels plus zero or more non-planar channels (e.g., height channels), as per section 2.3.

For high frequencies, SPAR analysis and parameter estimation is done for non-FoA channels (this is not done in system 200) as per section 3.2.7.2. In this embodiment, SPAR is operating in 4 channel downmix mode and to obtain a SPAR downmixing matrix for all frequencies, SPAR FoA metadata at high frequencies is estimated based on DirAC metadata using the methods described in section 3.2.

The quantized and coded SPAR metadata is used to generate a downmix matrix 407. An MDFT transform 406 is applied to the FOA, planar HOA2 and planar HOA3 signals. The MDFT coefficients and downmix matrix are frequency band mixed with cross-fades 408 to generate a 4-channel downmix. The 4-channel downmix is coded by one or more core codecs 409. The SPAR metadata coded in low frequencies for FOA channels and all frequencies for HOA channels and the DirAC metadata coded in high frequencies are packed together with the core codec coded bits to form final bitstream 410 output by encoder 400.

Downmixed channels are coded 409 by one or more core codecs (e.g., EVS). For FOA channels, SPAR metadata is coded for low frequencies whereas DirAC metadata is coded for high frequencies, while for non-FOA channels SPAR metadata is coded for the entire frequency range, and packed together with core codec coded bits to form the final bitstream 410 output by encoder 400. In this embodiment, SPAR metadata computation for HOA2 and HOA3 channels in high frequencies is done as per methods described in section 3.2.7.2. Further in this embodiment, as per methods described in section 3.2.7.2, SPAR metadata computation for HOA2 and HOA3 channels in high frequencies 404 depends on SPAR MD for FOA channels in high frequencies that is estimated form DirAC MD in high frequencies 303.

Note that in Embodiment 2 DirAC MD to SPAR MD conversion only happens for FOA channels, such that full-band SPAR MD is used for any HOA channels handled by SPAR. In general, any number of non-planar HOA channels could be handled by SPAR. In embodiment 2 only 1 non-planar HOA channel was added. Also, while these embodiments focus on 4 downmix channels (Ndmx=4), any number of transport channels (e.g., from 1-16) is possible.

2.4.5.2.2 Example Decoder Embodiment 2

Figure 5:
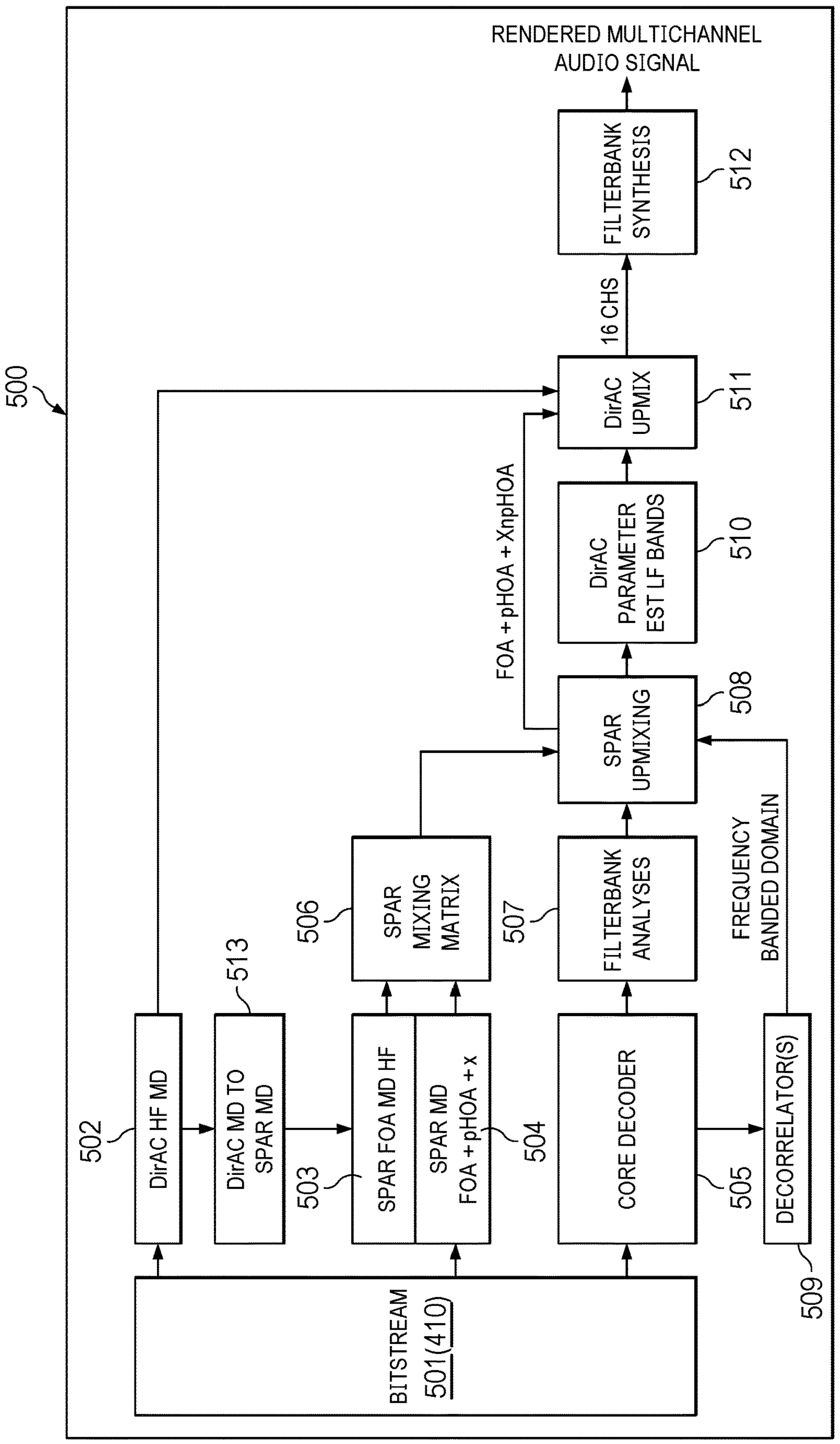
FIG. 5 is a block diagram of an alternate decoder implementation with frequency-based and channel-based split between SPAR and DirAC, according to one or more embodiments.

FIG. 5 is a block diagram of an alternate decoder 500 with frequency-based and channel-based split between SPAR and DirAC, according to one or more embodiments.

In this embodiment, decoder 500 receives the coded bitstream 504 and provides core codec coded bits to one or more core decoders 505. DirAC MD 502 in the high frequencies is decoded and then converted to SPAR MD 503 in the high frequencies using DirAC MD to SPAR MD conversion 513. In an embodiment, DirAC MD to SPAR MD conversion 513 at the decoder is same as DirAC MD to SPAR MD conversion 403 at the encoder. SPAR MD 504 corresponding to FOA and planar HOA and zero or more non-planar HOA channels is decoded and fed into SPAR mixing matrix 506. Missing SPAR MD 503 for the FOA channels in high frequencies is estimated from DirAC MD in the same way as the encoder 400. A SPAR upmix matrix 506 is generated using the SPAR MD 504 extracted from bitstream 510 and the high frequency SPAR MD 503 converted from the high frequency DirAC MD. Downmix channels that are reconstructed by one or more instances of core decoders 505 are converted into frequency banded domain with the help of a filterbank analyses 507, and the upmix matrix 506 is applied to reconstruct FOA, planar HOA2, planar HOA3 channels and zero or more non-planar (height) channels.

The decoded downmix channels output from the one or more core decoders 505 are fed into decorrelator(s) 509 and the outputs of decorrelator(s) 509 are input together with the upmix matrix into SPAR upmixing unit 508 to reconstruct the FOA, planar HOA2 and planar HOA3 channels. The decorrelation can be implemented in the time domain or frequency banded domain (e.g., CLDFB domain). The decorrelator(s) may either generate time domain decorrelated output and then convert it into the frequency banded domain, or convert the input into the frequency banded domain and generate decorrelated outputs in the frequency banded domain. The output channels of 508 are fed into DirAC parameter estimator 510, which estimates the DirAC metadata in low frequencies based on the reconstructed FOA signal in the frequency banded domain and uses the DirAC parameters in high frequencies extracted from bitstream 501. Alternatively, DirAC upmixer 508 may estimate DirAC parameters in the entire frequency range based on the FOA signal in the frequency band domain (e.g., CLDFB domain) and ignore the DirAC parameters in high frequencies from the bitstream 501.

DirAC upmixer 511, uses the DirAC metadata from 510 and 502 and converts the FOA, planar HOA2, planar HOA3 and zero or more non-planar channels into an HOA3 output which is a frequency band domain (e.g., CLDFB domain) representation of the original 16 channel HOA3 input to encoder 400. Synthesizer 512 (e.g., CLDFB synthesizer) synthesizes/renders the 16 channel HOA3 frequency band domain representation into the time domain representation for playback on various audio systems with different speaker configurations and capabilities. It should be noted that output of decorrelator(s) 509 is in CLDFB domain such that it covers embodiments where a time domain decorrelator is followed by CLDFB analyses and CLDFB analyses with CLDFB domain decorrelation.

2.4.6 Diffuseness in DirAC Upmix Channels

When estimating higher order channels from first order channels using the DirAC approach, the directional panning in the higher order channels that are upmixed using DirAC approach can be done by using DOA angles and spherical harmonics responses. However, the addition of diffuseness and decorrelation to these higher order channels should be handled carefully as it is known that too much decorrelation may hurt the audio quality and too little decorrelation may cause spatial collapse.

Below mentioned are embodiments for adding diffuseness to the higher order channels that are upmixed by DirAC approach:

2.4.6.1 Add Uniform Decorrelation to all HOA Upmixed Channels

In some embodiments, Nd decorrelated channels that are uncorrelated with respect to W channel are computed, where Nd is the number of HOA channels that are to be upmixed by DirAC from FOA channels. The $\psi$ (diffuseness) is computed using one of ways described in this document and then compute:

$$\text{Diffuseness}_{factor}(i) = \psi * Norm(i), \quad [24]$$

where i is the channel index and Norm is the corresponding normalization factor that is computed as per given Ambisonics normalization, e.g., SN3D normalization. Diffuseness$_{factor}$ (i) is applied to the i$^{th}$ decorrelated channel to get the diffused component for the corresponding HOA channel. In an example embodiment, if input to the DirAC upmixer is FOA channels (4 channels) and HOA3 channels are to be upmixed from input FOA channels, then the number of decorrelator outputs needed are 12 ($N_d$=12). The upmixed HOA channel H(i) can represented as:

$$H(i) = \text{energy\_Ratio\_factor} * Resp_i * W + \text{Diffuseness}_{factor}(i) * D_i(W) \quad [25]$$

where Resp$_i$ is the spherical harmonics response for corresponding channel index and is computed using DOA angle $\theta_D$, where in $\theta_D$ can be represented in terms of azimuth and elevation angles. The energy_Ratio_factor can be computed as $(1-\psi)$. $D_i$(W) is the ith decorrelated channel.

The above approach may result in too much decorrelation and may make the reconstructed scene more diffused than desired. Also, it may be computationally expensive to generate too many decorrelator outputs and scaling them to get desired diffuseness levels.

2.4.6.2 Add Directional Decorrelation to all Upmixed Channels

In this embodiment, directional diffuseness information is sent from the encoder to the decoder. The decoder uses this directional diffuseness information, and adds only a desired amount of decorrelation to the upmixed HOA channel. This method is applicable to cases where input to the encoder is HOA and due to bitrate and complexity limitation, only a few selected channels are reconstructed using SPAR, whereas the remaining channels are upmixed using DirAC. In an example implementation, the encoder can compute directional diffuseness using P (decorrelation) coefficients computed by SPAR in section 2.3. This method uses additional information to be sent to the decoder from the encoder.

2.4.6.3 Add Decorrelation to Selected Upmixed Channels

In this embodiment, the addition of diffuseness is limited to a few selected channels to keep the overall diffuseness within desired limits. This method also reduces computational complexity. The selection of channels for diffuseness addition can be static or dynamic based on signal characteristics.

2.4.6.3.1 Static Selection of Channels

In this embodiment, decorrelation is added to a selected few HOA channels. These channels are chosen based on perceptual importance. In an example implementation, if FOA and planar HOA channels are reconstructed by SPAR, and only non-planar HOA channels are to be upmixed using DirAC to get HOA3 output in ACN-SN3D format, then channel index 6, 10, 12, 14 (channel index ranging from 0 to 15) can be chosen to add decorrelation. This method does not require any additional information to be sent to decoder.

2.4.6.3.2 Dynamic Selection of Channels

In this embodiment, the directional diffuseness information is computed at the encoder and sent to the decoder to select the channels to which diffuseness is to be added while upmixing. This embodiment is only applicable to cases where input to the encoder is HOA. Only the channels in which the amount of decorrelation needed is higher than a first threshold value are chosen at the DirAC decoder to add decorrelation. In an example implementation, the encoder computes directional diffuseness using P (decorrelation) coefficients computed by SPAR in section 2.3, compares the P coefficients values against a first threshold and codes the channel indices which have P coefficients higher than a first threshold value. These indices are read by the decoder. If the number of channel indices exceeds a second threshold value, then limited indices can be chosen based on P coefficients values and perceptual importance of a given channel. This embodiment requires additional information to be sent to decoder from encoder.

To perform frequency based split as mentioned in section 2.4.1., an efficient mechanism is desired to convert DirAC metadata to SPAR in DirAC frequency bands and SPAR metadata to DirAC in SPAR frequency bands, so that DirAC and SPAR metadata can be reconstructed in all bands when required to perform upmix or downmix. Below are example embodiments to convert DirAC metadata to SPAR and SPAR metadata to DirAC.

2.5 DirAC to SPAR Conversion

In some embodiments, an approximation of input covariance matrix is computed based on quantized DirAC MD parameters (Azimuth angle (Az), Elevation angle (El), diffuseness). Az and El are also referred to as DOA angle $\theta_D$ in this document.

2.5.1 Equations

In some embodiments, the model-covariance blocks calculate the covariance matrix and prediction coefficients from the DirAC DOAs and diffuseness as follows $$R = \begin{pmatrix} R_{w,w} & R_{w,x} & R_{w,y} & R_{w,z} \\ R_{x,w} & R_{x,x} & R_{x,y} & R_{x,z} \\ R_{y,w} & R_{y,x} & R_{y,y} & R_{y,z} \\ R_{z,w} & R_{z,x} & R_{z,y} & R_{z,z} \end{pmatrix}, \quad [26]$$

here, R is a covariance matrix for FOA channels of Ambisonics input that is estimated using DirAC metadata. Example computation of R are given below.

2.5.2 Example Covariance Computations

In some embodiments, the covariance is computed as follows:

$$Resp_w = Y_{0,0}(\theta_D),\ Resp_x = Y_{1,1}(\theta_D),\ Resp_y = Y_{1,-1}(\theta_D),\ Resp_z = Y_{1,0}(\theta_D) \quad [27]$$

$$\text{where } Resp_w = 1 \text{ and } \sqrt{\left(Resp_x^2 + Resp_y^2 + Resp_z^2\right)} = 1,$$

$$R_{i,j} = (1-\psi)E\ Resp_i * Resp_j \quad [28]$$

$$\text{for } W \text{ variance } R_{ww} = R_{ww} + \psi E \quad [29]$$

$$\text{for side channel variance } R_{ii} = R_{ii} + \psi E * \frac{1}{\sqrt{3}} * \frac{1}{\sqrt{3}} \quad [30]$$

wherein, i and j can be w, x, y, z.

In the above equation, E is an approximation of overall signal energy (as given in [33] below). This is obtained by adding a rough estimation of directional energy and diffused energy. Let $w_r$ be the real bin sample of W channel in MDFT domain, the energy corresponding to each bin is computed as follows:

$$E(f) = w_r * w_r. \quad [31]$$

The energy is then converted into frequency banded power by applying filterbank responses of each band. The frequency banded energy in each band is extrapolated to compute overall signal energy as follows:

$$E = E * \left(Resp_w^2 + Resp_x^2 + Resp_y^2 + Resp_z^2\right) \quad [32]$$

The diffused energy component is added as follows:

$$E = E * \left(1 + \psi^2\right). \quad [33]$$

In some embodiments, when the covariance smoothing is turned off, the above computed covariance is used to calculate SPAR coefficients as usual.

3.0 OTHER EMBODIMENTS 3.1 DirAC MD Computation 3.1.1 Improved Computation of DirAC Diffuseness DirAC needs time smoothing to compute diffuseness parameter. In some embodiments, a simple parameter averaging is performed over 160 ms (Eqn. 12 from Section 2.2.2.2)

In some embodiments, SPAR's Covariance smoothing and/or the transient detector-ducker algorithms can be used to improve computation of the DirAC diffuseness parameter. For example, SPAR's covariance smoothing algorithm, described in PCT Application No. PCT/2020/044670, filed Jul. 31, 2020, for "Systems and Methods for Covariance Smoothing," can be adapted to weigh recent audio events more heavily that events further into the past, and can do this differently at each frequency band. This may be advantageous over a simple averaging operation. Using transient detection and ducking, the diffuseness value could be instantaneously reduced during short transients without disturbing the long-term smoothing process.

Because the time smoothing causes long-term time dependence as well as smoothness over time, in another embodiment differential coding can be used to reduce MD bitrate and improve frame loss resilience.

3.1.2 Computation of DirAC Metadata in Frequency Banded Covariance Domain

Based on the DirAC analysis captured in section 2.0, in some embodiments DirAC MD can be computed based on input frequency banded covariance matrix instead of computing DirAC MD in the FFT (Fast Fourier Transform) or MDFT domain and then converting it into a frequency banded domain.

In some embodiments, computation of SPAR metadata can be done based on an input frequency banded covariance as shown in section 2.0.

In some embodiments, computing both SPAR and DirAC metadata from the input covariance allows for better conversion of SPAR to DirAC and DirAC to SPAR MD in the desired bands. It is also computationally efficient. Below is an example of how DirAC MD can be computed from input covariance.

1. Compute an N*N frequency banded covariance matrix, where Nis the number of input channels.
2. Smooth the covariance matrix as mentioned in section 3.1.1.
3. Compute reference power as trace of covariance matrix.
4. Compute intensity as $R_{wx}$, $R_{wy}$, $R_{wz}$, here $R_{wx}$, $R_{wy}$, $R_{wz}$ are covariance of W channel and X, Y, Z channels.
5. Compute intensity norm as $$I_{norm} = \sqrt{(R_{wx}^2 + R_{wy}^2 + R_{wz}^2}$$

6. Compute direction vector as $$dv_{ws} = \frac{R_{ws}}{\sqrt{(R_{wx}^2 + R_{wy}^2 + R_{wz}^2)}},$$

here, s can be x, y, z, and then compute azimuth and elevation angles as per Equations [5] and [6] in Section 2.2.2.1.

Similarly, diffuseness computation can be done based on frequency banded covariance matrix as follows.

For diffuseness, first, reference power E and intensity I of input signal are computed in a given frequency band.

$$E = R_{ww} + R_{yy} + R_{xx} + R_{zz}, \quad [34]$$

$$I_x = R_{wx}, I_y = R_{wy}, I_z = R_{wz}. \quad [35]$$

Given that covariance is already smoothed as mentioned in section 3.1.1, then the diffuseness can be computed as $$\text{Diffuseness} = \psi = 1 - \frac{\sqrt{(I_x^2 + I_y^2 + I_z^2)}}{0.5 * E}, \quad [36]$$

$$\psi = \max(0, \min(1, \psi)), \quad [37]$$

$$\text{Energy ratio} = 1 - \psi. \quad [38]$$

In some embodiments, before computing diffuseness, E and I are further averaged using a long term averaging filter as given below:

$$E_a = (1 - f_e) * E_{a-1} + f_e * E \quad [39]$$

$$I_a = (1 - f_i) * I_{a-1} + f_i * I \quad [40]$$

Here, $E_a$ and $I_a$ are the long term average for energy and intensity, respectively, and these values are then used, instead of E and I, in the computation of diffuseness computation equation [36]. The factors $f_e$ and $f_i$ in [39] and [40] are examples of smoothing factors.

3.1.3 Improvement to Reference Power (E) Computation

In some embodiments, an alternate method can be used to compute reference power that results in better estimates of diffuseness and leads to better estimates of SPAR coefficients when they are derived from DirAC coefficients.

For diffuseness, first, reference power E and intensity I of input signal are computed in a given frequency band:

$$E = R_{ww} + R_{yy} + R_{xx} + R_{zz}, \quad [41]$$

$$I_x = R_{wx}, I_y = R_{wy}, I_z = R_{wz}. \quad [42]$$

Here, $R_{ij}$ is the covariance between ith and jth channel. The reference power is computed as $$E = \max(R_{ww}, 0.5 * E). \quad [43]$$

E computed in [43] provides better estimates for diffuseness and SPAR coefficients in cases where W channel energy is higher than 0.5*E. Diffuseness is computed $$\text{Diffuseness} = \psi = 1 - \frac{\sqrt{(I_{ax}^2 + I_{ay}^2 + I_{az}^2)}}{E_a}. \quad [44]$$

Here, $E_a$, $I_{ax}$, $I_{ay}$, $I_{az}$ is computed as long-term averages of E, $I_x$, $I_y$, $I_z$. Alternatively, $E_a$, $I_{ax}$, $I_{ay}$, $I_{az}$ may also be computed based on smoothened covariance matrices. Diffuseness can then be limited as $$\psi = \max(0, \min(1, \psi)), \quad [45]$$

$$\text{Energy ratio} = 1 - \psi. \quad [46]$$

SPAR coefficients can be computed from DirAC coefficients with any of the methods described in this document.

3.2 Improvements to DirAC to SPAR MD Conversion 3.2.1 Alternative Ways to Compute Covariance/Spar MD from DirAC In some embodiments, passive prediction coefficients can also be computed as $Resp_i*Resp_j$, wherein i and j can be w, x, y, z, which should be similar to the direction vector, dv, for a given side channel. This way prediction coefficients will be close to actual SPAR prediction coefficients when variance of W channel is less than $I_{norm}$ in frequency banded domain. In some embodiments, the additional parameter $$\frac{R_{ww}}{I_{norm}},$$

can be sent to the decoder for a better estimate of prediction coefficients when the variance of W channel is greater than $I_{norm}$. In some embodiments, prediction coefficients may also be computed directly from DirAC metadata 3.2.2 Quantization of DirAC Metadata In some embodiments, SPAR MD is computed based on quantized DirAC MD.

3.2.3 Generic Reconstruction of SPAR Coefficients from DirAC Metadata for any Downmix Configuration In some embodiments, the input covariance, R, is a 4×4 matrix computed based on DirAC parameters as follows:

$$R_{ij} = (1 - c\psi) * E * Resp_i * Resp_j \text{ when } i \,!= j, \quad [47]$$

$$R_{ww} = E * Resp_w * Resp_w,$$

$$R_{ii} = (1 - c\psi) * E * Resp_i^2 + Q_i * \psi * E \text{ when } i \,!= w,$$

where, i and j can be w, x, y, z, $Resp_w=Y_{0,0}(\theta_D)$, $Resp_x=Y_{1,1}(\theta_D)$, $Resp_y=Y_{1,-1}(\theta_D)$, $Resp_z=Y_{1,0}(\theta_D)$ are the spherical harmonics, $Q_i$ and c are constants in the range 0 and 1. Setting c=1 and $Q_i$=1 would make it similar to equations mentioned in section 2.5, in which case both encoder and decoder would have prior knowledge about these constants. In some embodiments $Q_i$ and c can be dynamically computed based on the actual input covariance matrix and above mentioned approximation of input matrix from DirAC parameters.

Given that SPAR coefficients are normalized with respect to covariance, SPAR coefficients derived from input covariance R are equal to SPAR coefficients derived from E*R, where E can either be the variance of the W channel or overall signal energy or any constant.

In some embodiments, a normalized covariance matrix R_norm is derived based on DirAC parameters only. R_norm is a 4×4 covariance matrix for FOA channels and is an approximation of actual normalized input covariance matrix, where the actual input covariance matrix is given as:

$R_{in}=UU^T$, 4×4 covariance matrix for FOA input channels, where $U=[W\ X\ Y\ Z]^T$, FOA input, and R_norm can be computed based on DirAC parameters only as given below:

$$R\_norm_{ij} = (1 - c\psi) * Resp_i * Resp_j \text{ when } i \,!= j, \quad [48]$$

$$\text{and } R\_norm_{ww} = Resp_w * Resp_w \text{ and } R\_norm_{ii} = (1 - c\psi) * Resp_i^2 + Q_i \text{ when } i \,!= w \text{ channel index.}$$

SPAR coefficients, including prediction, cross prediction and decorrelation coefficients, are computed from normalized covariance $R\_norm_{ij}$ as disclosed in section 2.3.

3.2.3.1 Example Reconstruction of Prediction and Decorrelation Coefficients Directly from DirAC Metadata for 1 Channel Downmix From the above-mentioned normalized covariance matrix, SPAR coefficients can be computed based on computations in section 2.3 as follows.

The prediction coefficient is computed as $$PR_{x/y/z} = (1 - c\psi) * Resp_{x/y/z} \quad [49]$$

For a one channel downmix, the decorrelation coefficients are computed as $$P_x = sqrt\left((1 - c\psi) * Resp_x^2 + Q_x\psi - (1 - c\psi)^2 * Resp_x^2\right), \quad [50]$$

$$P_y = sqrt\left((1 - c\psi) * Resp_y^2 + Q_y\psi - (1 - c\psi)^2 * Resp_y^2\right), \quad [51]$$

$$P_z = sqrt\left((1 - c\psi) * Resp_z^2 + Q_Z\psi - (1 - c\psi)^2 * Resp_z^2\right). \quad [52]$$

Here, decorrelation coefficients depend on spherical harmonics response. To avoid this dependency, 3.2.4 can be used.

3.2.4 Another Variant of Generic Reconstruction of SPAR Coefficients from DirAC Metadata for any Downmix Configuration In this embodiment, a 4×4 covariance matrix, R, that is an approximation of actual input covariance $R_{in}$, is computed based on DirAC parameters as follows, where the elements of the matrix are approximated as:

$$R_{ij} = (1 - c\psi) * E * Resp_i * Resp_j \text{ when } i \,!= j, \quad [53]$$

$$\text{and } R_{ww} = E * Resp_w * Resp_w,$$

$$\text{and } R_{ii} = (1 - c\psi)^2 * E * Resp_i^2 + Q_i * E * \left(1 - (1 - c\psi)^2\right) \text{ when } i \,!= w \text{ channel index}$$

where $Resp_w=Y_{0,0}(\theta_D)$, $Resp_x=Y_{1,1}(\theta_D)$, $Resp_y=Y_{1,-1}(\theta_D)$, $Resp_z=Y_{1,0}(\theta_D)$ are the spherical harmonics, $Q_i$ and c are constants in the range 0 and 1 (e.g., c=1 and $Q_i$=⅓), in which case both the encoder and the decoder would have prior knowledge about these constants. In some implementation, $Q_i$ and c can be dynamically computed based on actual input covariance matrix and above mentioned approximation of input matrix from DirAC parameters.

Given that SPAR coefficients are normalized, the SPAR coefficients are derived from R similar to SPAR coefficients derived from E*R, where E can be variance of just W channel or overall signal energy or any constant.

The elements of a normalized 4×4 covariance matrix for FoA channels are derived based on DirAC parameters only:

$$R_{norm_{ij}} = (1 - c\psi)^1 * Resp_i * Resp_j \text{ when } i \mathrel{!}= j, \quad [54]$$

$$\text{and } R_{norm_{ww}} = Resp_w * Resp_w, \text{ and } R\_norm_{ii} =$$

$$(1 - c\psi)^2 * Resp_i^2 + Q_i(1 - (1 - c\psi)^2) \text{ when } i \mathrel{!}= w \text{ channel index}$$

SPAR coefficients, including prediction, cross prediction and decorrelation coefficients, are computed from R_norm as disclosed in section 2.3.

3.2.4.1 Example Reconstruction of Prediction and Decorrelation Coefficients Directly from DirAC Metadata for 1 Channel Downmix From the above-mentioned normalized covariance, SPAR coefficients can be computed based on computations in section 2.3 as follows The prediction coefficient can be computed as $$PR_{x/y/z} = (1 - c\psi) * Resp_{x/y/z}. \quad [55]$$

For a one channel downmix, decorrelation coefficient can then be computed as $$P_x = sqrt(Q_x(1 - (1 - c\psi)^2)), \quad [56]$$

$$P_y = sqrt(Q_y(1 - (1 - c\psi)^2)), \quad [57]$$

$$P_z = sqrt(Q_z(1 - (1 - c\psi)^2)). \quad [58]$$

Here, decorrelation coefficients do not depend on spherical harmonics response and only depend on diffuseness and some constants.

Computation of Constant "c"—Solution 1

In an example implementation, to further improve the prediction coefficients, (1−cψ) can be set such that the passive W prediction coefficients are $$PR_i = sqrt(1 - \psi) * Resp_i, \text{ here } i \text{ can be } x, y, z \quad [59]$$

Based on equation [53], this will result in value of c as $$c = \frac{1 - sqrt(1 - \psi)}{\psi}. \quad [60]$$

In an embodiment, to improve SPAR coefficients that are computed from DirAC MD, a 4×4 covariance matrix, R_norm, that is an approximation of actual normalized input covariance $R\_norm_{in}$, is computed based on DirAC parameters as follows, where the elements of the matrix are approximated as per [54] and [61] as given below $$R\_norm_{ij} = sqrt(1 - \psi) * Resp_i * Resp_j \text{ when } i \mathrel{!}= j \quad [61]$$

$$R_{norm_{ww}} = Resp_w * Resp_w \text{ and}$$

$$R_{norm_{ii}} = (1 - \psi) * Resp_i^2 + Q_i * \psi \text{ when } i \mathrel{!}= w \text{ channel index}$$

For a one channel downmix, based on Equations [62]-[64], the decorrelation coefficients are computed as $$P_x = sqrt(Q_x * \psi), \quad [62]$$

$$P_y = sqrt(Q_y * \psi), \quad [63]$$

$$P_z = sqrt(Q_z * \psi). \quad [64]$$

In some embodiments, the values of $Q_x$, $Q_y$, $Q_z$ can be set to ⅓.

Computation of Constant "c"—Solution 2

In another example embodiment, c can be computed such that $$1 - c\psi = \frac{I_{norm}}{\max(R\_in_{ww}, I_{norm})}. \quad [65]$$

Intensity normalization is computed as $$I_{norm} = \sqrt{(R\_in_{wx}^2 + R\_in_{wy}^2 + R\_in_{wz}^2)},$$

here, $R\_in_{ij}$ are the actual input covariance values and

Substituting this value of c in the prediction coefficient computation Equation $$PR_i = \frac{I_{norm}}{\max(R\_in_{ww}, I_{norm})} * Resp_i, \quad [66]$$

which is a close approximation of $\frac{R\_in_{wi}}{\max(R\_norm_{ww}, I_{norm})}$, where $i$ can be $x, y, z$.

This prediction coefficient [66] is similar to the passive prediction coefficient computation disclosed in section 2.3.1.1. For this solution the value of c can be transmitted to the decoder.

3.2.5 Energy Compensation of DirAC Based Downmix

The covariance computation from DirAC metadata (MD) as disclosed in section 2.5.2 and in the solutions described in sections 3.2.3 and 3.2.4 assumes the signal to be perfectly SN3D normalized such that $$w = x + y + z, \quad [67]$$

where, w, x, y, z is the variance of W, X, Y, and Z channel respectively.

This assumption is not true in real life FoA captures, e.g., in overtalk situations, diffused background noise captures, etc. The above method results in spatial collapse especially when the number of downmix channels are limited to 1.

Energy compensation can be applied to prevent spatial collapse by scaling the downmix signal such that the upmixed signal is energy matched with respect to the input.

Below is an example implementation of energy compensation with 1 channel downmix.

The actual input covariance matrix, $R_{in_{N\times N}}$, is computed, such that N is the number of input channels and, $R_{in_{i,j}}$, is the frequency banded or broadband covariance of ith and jth input channel. For FOA input N=4, and i and j can be W, X, Y, Z.

The normalized actual input covariance matrix $R\_norm\_in_{N\times N}$, is computed as $$R\_norm\_in_{i,j} = R_{in_{i,j}} / R_{in_{w,w}} \quad [68]$$

The DirAC metadata based normalized covariance estimate, $R\_norm_{N\times N}$, is computed as per either of the techniques mentioned in sections 2.5.2, 3.2.3 and 3.2.4.

The scaling factor is obtained as $$\text{scale} = sqrt(\text{trace}(R\_norm\_in_{NxN}) / \max(eps, \text{trace}(R\_norm_{NxN}))), \quad [69]$$

$$\text{scale} = \max(\text{thresh}_{low}, \min(\text{thresh}_{high}, \text{scale})). \quad [70]$$

Here, $\text{thresh}_{low}$ and $\text{thresh}_{high}$ are lower and upper bounds to the scale factor. In an example embodiment, $\text{thresh}_{low}=1$ and $\text{thresh}_{high}=2$.

The SPAR downmix matrix and SPAR coefficients, including prediction, cross prediction and decorrelation coefficients are computed as disclosed in section 2.3, using the DirAC estimated normalized input covariance matrix.

Let the downmix matrix be $\text{Downmix}_{1\times N}$. The downmix matrix is scaled by scale computed in equation [70] in section 3.2.5. Let the actual downmix matrix be $\text{Downmix\_act}_{1\times N}$ and $$\text{Downmix\_act}_{1xN} = \text{scale} * Downmix_{1xN}. \quad [71]$$

In an example embodiment, for 1 channel downmix, $\text{Downmix}_{1\times N}$ is given as follows as per Equation [72], $$Downmix_{1xN} = [F_W, F_Y, F_z, F_x] \quad [72]$$

Here, $F_W$, $F_Y$, $F_z$, $F_x$ are the gains that are used to mix Y, Z, and X channel, respectively, into W channel to form a downmix channel. Post scaling with "scale" value, the downmix channel is computed as:

$$W' = \text{scale} * (F_W * W + F_Y * Y + F_Z * Z + F_X * X). \quad [73]$$

In another example implementation, $F_W=1$, $F_Y=F_z=F_x=0$, and W'=scale*W. Another example implementation with computation of $F_W$, $F_Y$, $F_z$, $F_x$ is described in section 3.3.

The metadata parameters are unmodified with this scaling. The encoder encodes metadata parameters and the scaled downmix and the bitstream are transmitted to decoder.

The decoder decodes the scaled downmix channel W and spatial parameters including the prediction and decorrelation parameters, and applies the prediction and decorrelation parameters to reconstruct the original input scene such that:

$$W_{out} = W'\left(1 - f_s\left(pr_x^2 + pr_y^2 + pr_z^2\right)\right), \quad [74]$$

$$X_{out} = pr_x W' + p_x D_1(W'), \quad [75]$$

$$Y_{out} = pr_y W' + p_y D_2(W'), \quad [76]$$

$$Z_{out} = pr_z W' + p_z D_3(W'). \quad [77]$$

Here, $pr_x$, $pr_y$ and $pr_z$ are prediction parameters, $p_x$, $p_y$, and $p_z$ are decorrelation parameters, $D_1(W')$, $D_2(W')$, $D_3(W)$ are 3 decorrelated channels decorrelated with respect to W', $f_s$ is active scaling as described in section 3.3. In an example implementation $0\le f_s \le 1$.

This approach will scale the reconstructed signal by scale factor computed in equation [70] in this section, thereby energy matching the reconstructed scene with respect to the input without sending any additional parameter in the bitstream.

3.2.6 Extrapolating Directional Diffuseness in DirAC Bands

DirAC based covariance estimates assumes uniform diffuseness in all directions which may not be true with real life signals for e.g., overtalk scenarios. Adding directional information on top of the diffuseness parameter computed in Equation [7] in section 2.2 would result in additional metadata to be coded in the bitstream. SPAR does provide directional diffuseness information in its metadata and the directional information in high bands may be extrapolated using the directional information in lower bands.

In an example embodiment for FOA input with one channel downmix, if SPAR is coding up to the 6 kHz frequency range and the DirAC parameters are sent for 6-24 kHz frequency range, then the directional information in the SPAR frequency bands can be extracted as follows:

$$dir_{diffusseness,x} = \frac{P_x^2}{\max\left(\text{epsilon}, P_x^2 + P_y^2 + P_z^2\right)}, \quad [78]$$

$$dir_{diffusseness,y} = \frac{Pd_y^2}{\max\left(\text{epsilon}, P_x^2 + P_y^2 + P_z^2\right)}, \quad [79]$$

$$dir_{diffusseness,z} = \frac{P_z^2}{\max\left(\text{epsilon}, P_x^2 + P_y^2 + P_z^2\right)}. \quad [80]$$

Here, $p_x$, $p_y$, and $p_z$ are SPAR decorrelation parameters in the last SPAR band.

This directional information can be used in high frequency bands while computing downmix using DirAC parameters. An example estimation of normalized covariance matrix from DirAC metadata with directional diffuseness is as follows. R_norm is a 4×4 matrix for FOA channels that is computed as $$R_{norm_{ij}} = (1 - c\psi) * Resp_i * Resp_j \text{ when } i \mathrel{!}= j, \text{ and } R_{norm_{ww}} = Resp_w * Resp_w \quad [81]$$

$$R_{norm_{ii}} = (1 - c\psi)^2 * Resp_i^2 + dir_{diffusseness,i}\left(1 - (1 - c\psi)^2\right) \text{ when } i \mathrel{!}= w \text{ channel index}$$

where $Resp_w=Y_{0,0}(\theta_D)$, $Resp_x=Y_{1,1}(\theta_D)$, $Resp_y=Y_{1,-1}(\theta_D)$, $Resp_z=Y_{1,0}(\theta_D)$ are the spherical harmonics, c is a constant in the range 0 and 1 (e.g., c=1), in which case both the encoder and the decoder would have prior knowledge about this constant. In some implementation, c can be dynamically computed based on actual input covariance matrix and above mentioned approximation of input matrix from DirAC parameters.

The downmix matrix and SPAR coefficients, including prediction, cross prediction and decorrelation coefficients, are computed from R_norm as disclosed in section 2.3. Example computation of Prediction coefficients and decorrelation coefficients for 1 channel downmix is given in [55] to [58]. Downmix matrix can be further scaled as per [70] to better energy match the reconstructed Ambisonics signal at the decoder with the Ambisonics signal at the encoder input.

3.2.7 DirAC to SPAR Metadata Conversion for HoA Channels 3.2.7.1 Estimating HoA Input Covariance Matrix from DirAC Parameters In this method DirAC parameters are used to estimate the input covariance matrix.

The N×N covariance R is computed based on DirAC parameters, where N is number of input channels in HOA signal, here R is an approximation of actual input covariance matrix. In some embodiments, the covariance, R, can be computed as:

$$R_{ij} = (1 - c\psi) * E * Resp_i * Resp_j \text{ when } i \mathrel{!}= j, \text{ and } R_{ww} = E * Resp_w * Resp_w \text{ and } R_{ii} = (1 - c\psi)^2 * E * Resp_i^2 + Q_i * E * \left(1 - (1 - c\psi)^2\right) \text{ when } i \mathrel{!}= w \text{ channel index} \quad [82]$$

Here, $Resp_i$ are the spherical harmonics, $Q_i$ and c are constants in the range 0 and 1, e.g., c=1 and $Q_i$=1/3 for first order channels, i.e., 0<=$Q_i$<=3, $Q_i$=1/5 for second order channels, i.e., 4<=$Q_i$<=8, $Q_i$=1/7 for third order channels, i.e., 9<=i<=15, in which case both the encoder and the decoder have prior knowledge about these constants. In some embodiments, $Q_i$ and c are dynamically computed based on actual input covariance matrix and above mentioned approximation of input matrix from DirAC parameters.

Given that SPAR coefficients are normalized, the SPAR coefficients derived from, R are equal to SPAR coefficients derived from E*R, where E can be variance of just W channel or overall signal energy or any constant.

The covariance R in equation [81] is normalized and the elements of this N×N normalized covariance matrix, R_norm, are derived based on DirAC parameters only as follows:

$$\text{R\_norm}_{ij} = (1 - c\psi)^1 * Resp_i * Resp_j \text{ when } i \mathrel{!}= j, \text{ and } \text{R\_norm}_{ww} = Resp_w * Resp_w \text{ and } \text{R\_norm}_{ii} = (1 - c\psi)^2 * Resp_i^2 + Q_i\left(1 - (1 - c\psi)^2\right) \text{ when } i \mathrel{!}= w \text{ channel index.} \quad [83]$$

SPAR coefficients, including prediction, cross prediction and decorrelation coefficients, are computed from R_norm as disclosed in section 2.3.

3.2.7.2 Improving Spatial Resolution of DirAC to SPAR Conversion by Limiting DirAC Covariance Estimation to FOA Channels Only It has been observed that covariance estimation for HOA channels from DirAC parameters is not optimal when there is critical information in HOA channels. Loss of ambiance has been observed when estimating the entire N×N covariance matrix (or all HOA SPAR parameters) from the DirAC parameters. A separate approach is desired for such HOA signals. Below mentioned are few embodiments for DirAC to SPAR conversion with improved spatial resolution.

3.2.7.2.1 By Computing and Coding SPAR HoA Parameters Independently

In this method DirAC parameters are used to estimate input covariance matrix for only FOA channels and then from that estimate SPAR parameters corresponding to FOA channels are computed. This is done by methods described in section 3.2. and 3.2.4.

SPAR parameters including prediction coefficients, cross-prediction coefficients and decorrelation coefficients for HoA channels are computed independently based on actual covariance matrix of the input signal based on methods described in section 2.3.

This method will require coding of SPAR HoA parameters into bitstream for all frequencies.

3.2.7.2.2 Alternate Computation of SPAR HOA Parameters Based on DirAC Estimated FOA This method is applicable to SPAR modes where number of downmix channels are less than number of input channels to SPAR, that is cases where SPAR has cross-prediction and/or decorrelation coefficients to code for HOA channels. In this method DirAC parameters are used to estimate the input covariance matrix for only FOA channels and then from that SPAR parameters corresponding to FOA channels are computed. This is done by methods described in sections 3.2. and 3.2.4.

Computation of HOA Prediction Coefficients

SPAR prediction coefficients for HOA channels are computed independently based on the actual covariance matrix of the input signal based on methods described in section 2.3.

Computation of HOA Cross-Prediction Coefficients

Section 2.3 shows that cross-prediction coefficients in SPAR MD depend on predicted side channels or residual channels in the downmix. Furthermore, the residual channels in FOA component of the Ambisonics input depends on SPAR MD that is derived from DirAC MD in a set of frequency bands. Hence, cross-prediction coefficients in HOA channels can be dependent on DirAC MD in FOA channels and it has been observed that computing cross-prediction coefficients in HOA channels based on DirAC MD in FOA channels and SPAR MD in FOA and HOA channels can lead to a better estimate of these coefficients. In an example implementation, HOA channels (4 to N) prediction coefficients are computed from an actual input covariance matrix as described in section 2.3. These prediction coefficients are quantized based on a quantization strategy. DirAC estimated FoA prediction coefficients along with SPAR estimated HOA quantized prediction coefficients are used to generate the downmix matrix as described in section 2.3. A post prediction covariance matrix is computed from the actual input covariance and downmix matrix computed above. Cross-prediction coefficients are then computed from post prediction matrix as described in section 2.3.

Computation of HOA Decorrelation Coefficients

It has been observed that computing HOA decorrelation coefficients directly from Ambisonics input covariance as described in section 2.3 without having any dependency on DirAC MD in FOA channels leads to better estimation of decorrelation coefficients and results in desired amount of decorrelation in the recontructed HOA channels at the decoder. This is helpful in reducing the audio artifacts that can arise due to too much decorrelation and also avoids spatial collapse due to too less decorrelation. In an example implementation, first, the prediction coefficients corresponding to all side channels are computed from actual input covariance matrix as described in section 2.3, where side channels in Ambisonics are all channels input except the W channel. Then, the computation of decorrelation coefficients from the prediction coefficients and the covariance matrix is the same as described in section 2.3. This method will code the SPAR HoA parameters into the bitstream for all frequencies.

3.3 Active W Downmix Based on DirAC Metadata 3.3.1 Based on DirAC Based Covariance Estimation From DirAC metadata, the input covariance may be estimated as a DirAC metadata-based input signal (4×4) covariance matrix estimation as given in section 3.2.3 or 3.2.4:

$$R_{[4\times4]} = \begin{pmatrix} E & (1-c\psi)E\hat{u}^* \\ ((1-c\psi)E)\hat{u} & S \end{pmatrix}, \quad [84]$$

where û is 3×1 unit vector with elements $Resp_x$, $Resp_y$, $Resp_z$ and, as per section 3.2.3, and S is a 3×3 matrix where the elements of the matrix are given by:

$$S_{ij} = (1-c\psi)*E*Resp_i*Resp_j \text{ when } i\ != j, \text{ and} \quad [85]$$
$$S_{ii} = (1-c\psi)*E*Resp_i^2 + Q_i*\psi*E$$

Alternatively, S can be computed as given in section 3.2.4 as:

$$S_{ij} = (1-c\psi)*E*Resp_i*Resp_j \text{ when } i\ != j, \text{ and} \quad [86]$$
$$S_{ii} = (1-c\psi)^2*E*Resp_i^2 + Q_i*E*\left(1-(1-c\psi)^2\right).$$

One possible approach to performing active downmix based on above covariance matrix is by having following prediction matrix $$Pred_{[4\times4]} = \begin{pmatrix} 1 & F\hat{u}^* \\ -g\hat{u} & I_3 - gF\hat{u}\hat{u}^* \end{pmatrix}, \quad [87]$$

where $F = (1-c\psi)$, where, $g\hat{u}$ are the active prediction coefficients, and $\hat{u}$ is $[3\times1]$ unit vector $Resp_x, Resp_y, Resp_z$.

Then post prediction matrix can be given as $$\text{Post\_prediction}_{[4x4]} = Pred*R_{[4x4]}*Pred', \quad [88]$$

$$\text{Post\_prediction}_{[4x4]} = \begin{pmatrix} \ddots & \cdots \\ \hat{r} & \ddots \end{pmatrix}, \quad [89]$$

Other elements of the matrix in [89] are not shown as they are not relevant to the active downmixing gains computation.

Minimizing r̂ by setting û**r, results in a linear equation given by $$\text{linear}(g) = g\beta F^2 + 2\alpha gF + Eg - \beta F - \alpha,\ g = \frac{\alpha+\beta F}{\beta F^2 + 2\alpha F + E} \quad [90]$$

Here, β=û**S*û=E, α=(1−cψ)E, F=(1−cψ). Substituting the values in [90], E cancels out in the denominator and numerator and g can be computed directly from DirAC metadata on both the encoder and decoder side.

Actual downmix matrix for 1 channel downmix, post scaling, is given as $$Pred_{[1\times4]} = (r \quad rF\hat{u}^*), \text{ where } r \text{ is a scaling factor.} \quad [91]$$

The computation of the post prediction scaling factor "r" is done by matching the reconstructed W variance at decoder with the variance of W encoder input, $$r = \frac{g_w + \sqrt{g_w^2 + 4f_s g^2}}{2}, \quad [92]$$

where $$g_w = \sqrt{\frac{E}{m}},$$

and m is the post predicted W variance without r scaling variance and, $f_s$, is a scaling constant between 0 and 1 (e.g., 0.5).

The scaled prediction coefficients are computed as follows $$g' = \frac{g}{r} \quad [93]$$

Here, g'û=[$pr_x$; $pr_y$; $pr_z$] are the active prediction coefficients. Computation of decorrelation coefficients is as follows $$\text{Post\_prediction}_{[4\times4]} = Pred*R_{[4\times4]}*Pred'$$

Here, Pred is the prediction matrix given in [91], decorrelation coefficients are computed from $\text{Post\_prediction}_{[4\times4]}$ as follows $$NRes_{uu} = \frac{Res_{uu}}{\max\left(\varepsilon, \text{Post\_prediction}_{w,w,tr}(|Res_{uu}|)\right)}, \quad [94]$$
$$P = \text{diag}\left(\sqrt{\max(0, \text{real}(\text{diag}(NRes_{uu})))}\right),$$

Here, $Res_{uu}$ is a 3×3 matrix and is equal to $\text{Post\_prediction}_{[2:4,\ 2:4]}$, and P=[$p_x$; $p_y$, $p_z$] are the decorrelation coefficients.

Computation of active W downmix channel from FOA input [W, Y, Z, X] is given as $$W' = \text{scale} * r * (W + F_Y * Y + F_Z * Z + F_X * X)$$
$$F_Y = F * Resp_y$$
$$F_X = F * Resp_x$$
$$F_Z = F * Resp_z$$

Computation of scale is given in [70], computation of another scale factor r is given in [92], W' is encoded with a core coder, DirAC MD is coded and together these coded bits are sent to decoder.

The inverse prediction matrix at the decoder is given as follows:

$$InvPred_{[4\times4]} = \begin{pmatrix} (1 - f_s g'^2) & 0 \\ g'\hat{u} & I_3 \end{pmatrix}, g' = \frac{g}{r} \quad [95]$$

Reconstruction of FOA channels at decoder is as follows $$W_{out} = W'\left(1 - f_s\left(pr_x^2 + pr_y^2 + pr_z^2\right)\right), \quad [96]$$
$$X_{out} = pr_x W' + p_x D_1(W'), \quad [97]$$
$$Y_{out} = pr_y W' + p_y D_2(W'), \quad [98]$$
$$Z_{out} = pr_z W' + p_z D_3(W'). \quad [99]$$

Here, $pr_x$, $pr_y$ and $pr_z$ are prediction parameters that are computed from DirAC MD as given in [90], $p_x$, $p_y$, and $p_z$ are decorrelation parameters that are computed from DirAC MD as given in [94], $D_1(W')$, $D_2(W')$, $D_3(W')$ are 3 decorrelated channels decorrelated with respect to W', $f_s$ is the scaling constant used in [92].

3.4 SPAR to DirAC Metadata Conversion

It may be desired to convert SPAR MD to DirAC MD in a set of frequency bands such that DirAC MD is available at all required frequency bands in order to perform upmix to desired output format at the decoder. Direct conversion from SPAR MD to DirAC MD also saves complexity. In an example implementation, It is possible to derive directional vector do from prediction coefficients $$dv_s = \frac{PR_s}{\sqrt{\left(PR_x^2 + PR_y^2 + PR_z^2\right)}}. \quad [100]$$

Here, s can be x, y, z

Azimuth and elevation can then be computed based on equations [5] and [6].

3.4.1 Diffuseness Computation from SPAR Metadata

Assuming that SPAR perfectly reconstructs the covariance (COV) matrix, the output covariance matrix can be computed at the decoder from the input (DMX+decorrelators) covariance and upmix matrix. From the output COV, the reference power and intensity are computed and averaged over N frames (e.g., 8 frames). From that, diffuseness is computed as per Equation [7].

There are other embodiments to directly compute DirAC diffuseness from SPAR metadata without computing output covariance matrix as disclosed below.

3.4.1.1 Alternate Method for Diffuseness for 1 Channel Downmix with Passive W Downmix (where W Channel in Downmix is Same or Just Delayed Version of W Channel in Input)

Let the variance of W, X, Y, Z be w, x, y, z. In a 1 channel downmix case, y can be approximated as $$y = w\left(pr_y^2 + pd_y^2\right) \quad [101]$$

where, $pr_y$ is the prediction coefficient and $pd_y$ is the decorrelation coefficient for the Y channel. Similarly, x and z can be calculated for the X and Z channels. The reference power E can then be computed as (w+x+y+z), $$E = w\left(1 + pr_y^2 + pd_y^2 + pr_x^2 + pd_x^2 + pr_z^2 + pd_z^2\right). \quad [102]$$

Intensity can be computed as $$I_y = w * pr_y,\ I_x = w * pr_x,\ I_z = w * pr_z. \quad [103]$$

Referring to Equation [7], diffuseness i may be approximated directly from SPAR metadata as follows:

$$\psi = 1 - \frac{\sqrt{\left(pr_{slow,x}^2 + pr_{slow,y}^2 + pr_{slow,z}^2\right)}}{0.5 * \left(1 + pr_{slow,x}^2 + pr_{slow,y}^2 + pr_{slow,z}^2 + pd_{slow,x}^2 + pd_{slow,y}^2 + pd_{slow,z}^2\right)}. \quad [104]$$

Here, $pr_{slow,s}$ is either same as $pr_s$ or it could be a long time average of $pr_s$, $pd_{slow,s}$ is either same as $pd_s$ or it could be a long time average of $pd_s$, Here, s can be x, y, z.

3.4.1.2 Alternate Method for Diffuseness for 1 Channel Downmix with Active W Downmix Given the inverse matrix with active W computation as mentioned in section 3.3.1.

$$InvPred_{[4\times4]} = \begin{pmatrix} (1 - f_s g'^2) & 0 \\ g'\hat{u} & I_3 \end{pmatrix}, g' = \frac{g}{r} \quad [105]$$

Let the variance of W, X, Y, Z be w, x, y, z and in 1 channel downmix case, y can be approximated as $$y = w\left(pr_y^2 + pd_y^2\right). \quad [106]$$

Here, $pr_y$ is the prediction coefficient and $pd_y$ is the decorrelation coefficient for the Y channel. Similarly, x and z can be calculated as well.

The reference power can then be computed as (w+x+y+z), $$E = w\left(\left(1 - f_s g'^2\right)^2 + pr_y^2 + pd_y^2 + pr_x^2 + pd_x^2 + pr_z^2 + pd_z^2\right). \quad [107]$$

Intensity can be computed as $$I_y = w * pr_y,\ I_x = w * pr_x,\ I_z = w * pr_z. \quad [108]$$

Referring to Equation [7], diffuseness 4 may be approximated directly from SPAR metadata as (if we average w separately), $$\psi = 1 - \frac{\sqrt{(pr_{slow,x}^2 + pr_{slow,y}^2 + pr_{slow,z}^2)}}{0.5 * \left((1 - f_s g'^2)^2 + pr_{slow,x}^2 + pr_{slow,y}^2 + pr_{slow,z}^2 + pd_{slow,x}^2 + pd_{slow,y}^2 + pd_{slow,z}^2\right)}. \quad [109]$$

Here, $pr_{slow,s}$ is either same as $pr_s$ or it could be a long time average of $pr_s$, $pd_{slow,s}$ is either same as $pd_s$ or it could be a long time average of $pd_s$, Here, s can be x, y, z.

3.4.1.3 Alternate Method for Diffuseness for any Passive W Downmix Channel Configuration This method is based on the normalization of the input Ambisonics signal. For example, if the FoA input is normalized using Schmidt semi-normalization (SN3D), then it assumes that w=x+y+z, where w, x, y, z is the variance of W, X, Y, and Z channels, respectively. This makes w+x+y+z=2*w.

Substituting the variance assumption and intensity from equation [108] in section 3.4.1.1. into the diffuseness formula in Equation [7] gives, $$\text{Diffuseness} = \psi = 1 - \frac{w\sqrt{(pr_{slow,x}^2 + pr_{slow,y}^2 + pr_{slow,z}^2)}}{0.5 * (2 * w)}, \quad [110]$$

$$\text{Diffuseness} = \psi = 1 - \sqrt{(pr_{slow,x}^2 + pr_{slow,y}^2 + pr_{slow,z}^2)}. \quad [111]$$

Here, $pr_{slow,s}$ is either same as $pr_s$ or it could be a long time average of $pr_s$, here, s can be x, y, z.

Example Encoding Processes

Figure 6:
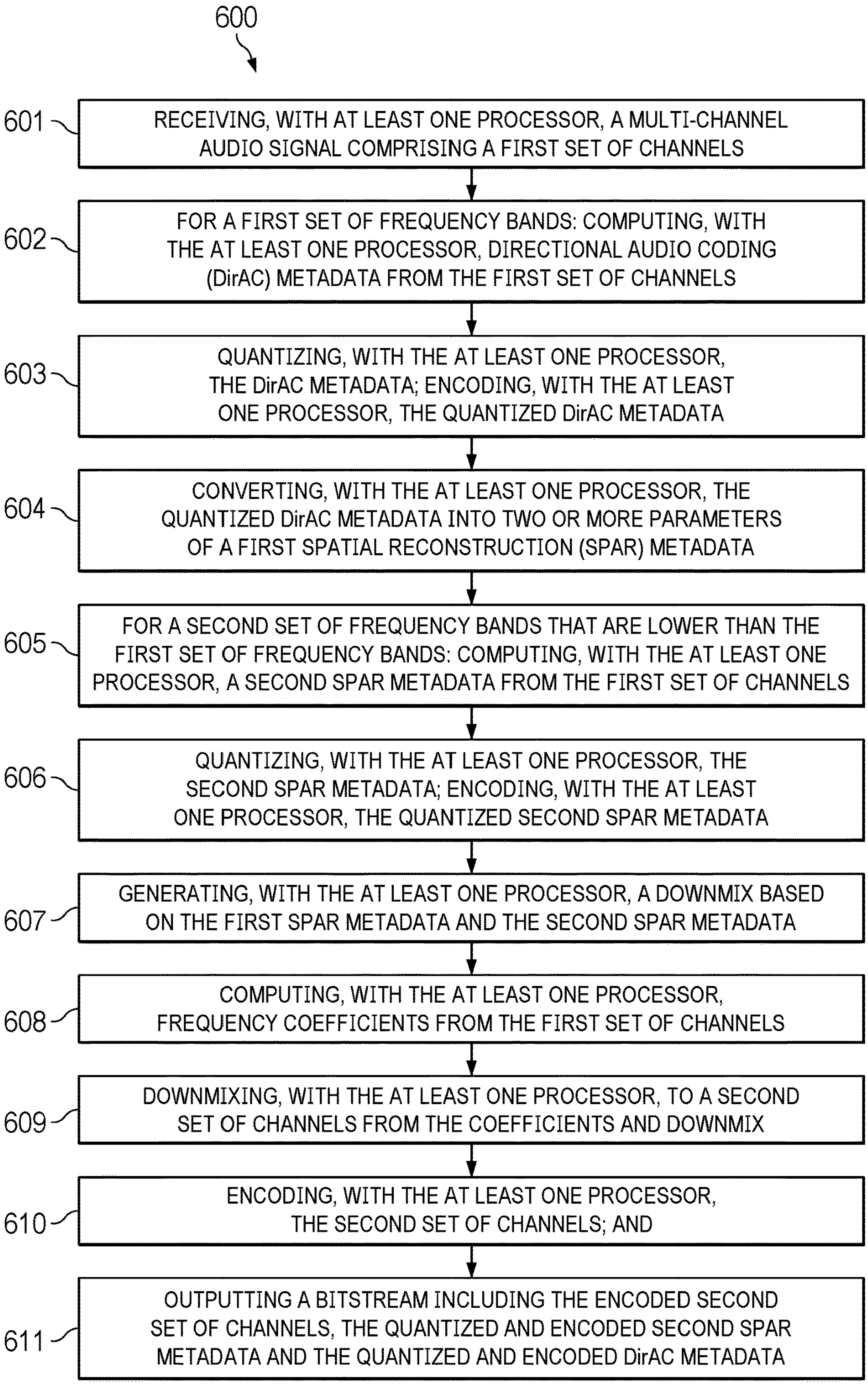
FIG. 6 is a flow diagram of a process of encoding using a codec for FOA input as described in reference to FIGS. 2 and 4, according to some embodiments.

FIG. 6 is a flow diagram of process 600 of encoding using the encoders as described in reference to FIGS. 2 and 4 for FOA input, according to some embodiments. Process 600 can be implemented using the electronic device architecture described in reference to FIG. 9.

Process 600 includes: receiving a multi-channel audio signal comprising a first set of channels (601); for a first set of frequency bands: computing directional audio coding (DirAC) metadata from the first set of channels (602); quantizing and encoding the DirAC metadata (603); converting the quantized and encoded DirAC metadata into two or more parameters of a first spatial reconstruction (SPAR) metadata (604); for a second set of frequency bands that are lower than the first set of frequency bands: computing a second SPAR metadata from the first set of channels (606); quantizing and encoding the second SPAR metadata (607); generating a downmix based on the first SPAR metadata and the second SPAR metadata (608); computing frequency coefficients from the first set of channels (609); downmixing to a second set of channels from the coefficients and downmix (610); encoding the second set of channels (611); and outputting a bitstream including the encoded second set of channels, the quantized and encoded second SPAR metadata and the quantized and encoded DirAC metadata (612). Each of these steps was previously described in reference to FIGS. 2 and 4.

Figure 7:
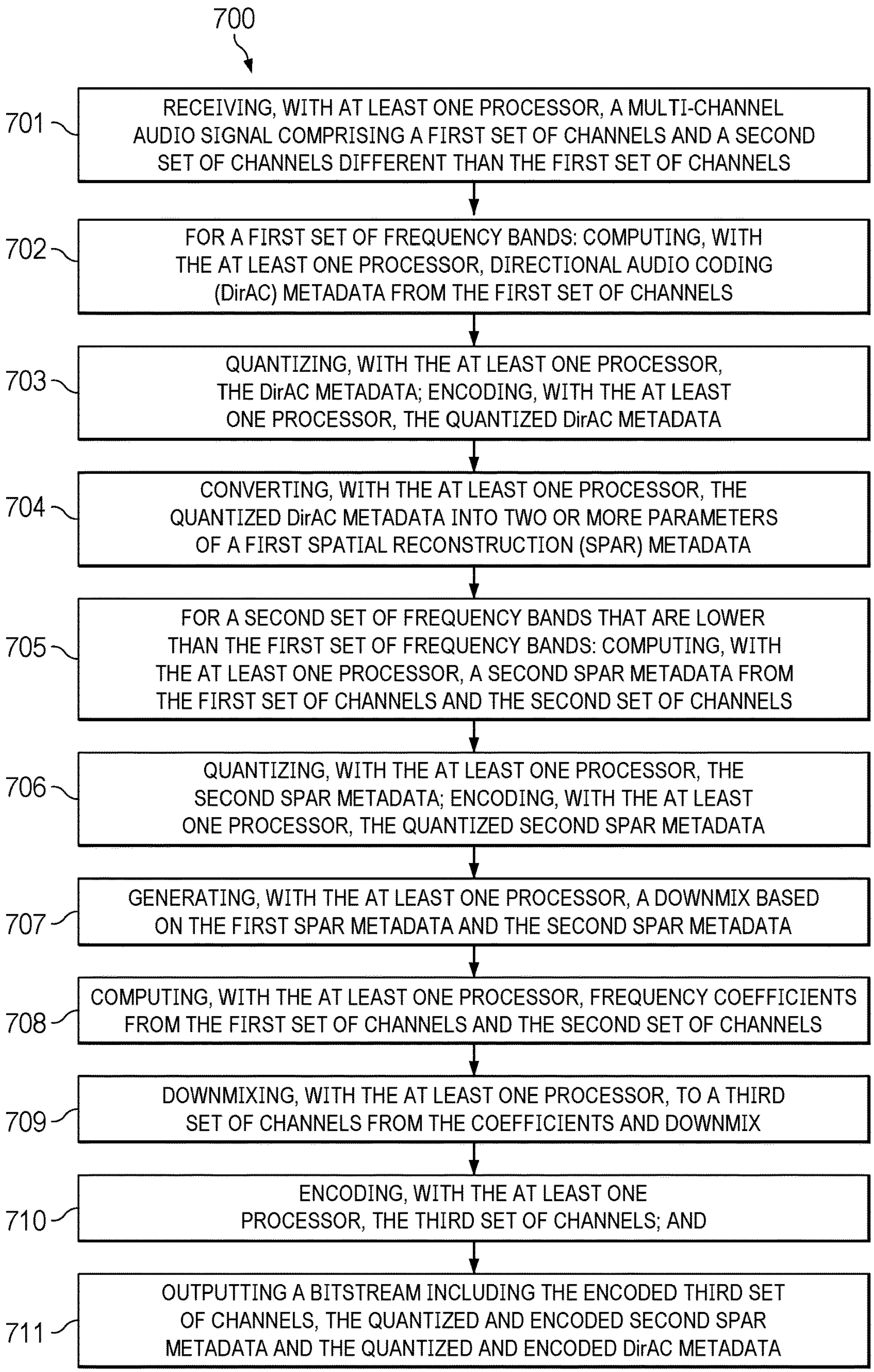
FIG. 7 is a flow diagram of a process of encoding using a codec for FOA plus HOA input as described in reference to FIGS. 2 and 4, according to some embodiments.

FIG. 7 is a flow diagram of process 700 of encoding using the encoders as described in reference to FIGS. 2 and 4 for FOA plus HOA input, according to some embodiments. Process 700 can be implemented using the electronic device architecture described in reference to FIG. 9.

Process 700 includes: receiving a multi-channel audio signal comprising a first set of channels and a second set of channels different than the first set of channels (701); for a first set of frequency bands: computing directional audio coding (DirAC) metadata from the first set of channels (702); quantizing and encoding the DirAC metadata (703); converting the quantized and encoded DirAC metadata into two or more parameters of a first spatial reconstruction (SPAR) metadata (704); for a second set of frequency bands that are lower than the first set of frequency bands: computing a second SPAR metadata from the first set of channels and the second set of channels (705); quantizing and encoding the second SPAR metadata (706); generating a downmix based on the first SPAR metadata and the second SPAR metadata (707); computing frequency coefficients from the first set of channels and the second set of channels (708); downmixing to a third set of channels from the coefficients and downmix (709); encoding the third set of channels (710); and outputting a bitstream including the encoded third set of channels, the quantized and encoded second SPAR metadata and the quantized and encoded DirAC metadata (711). Each of these steps was previously described in reference to FIGS. 2 and 4.

Figure 8:
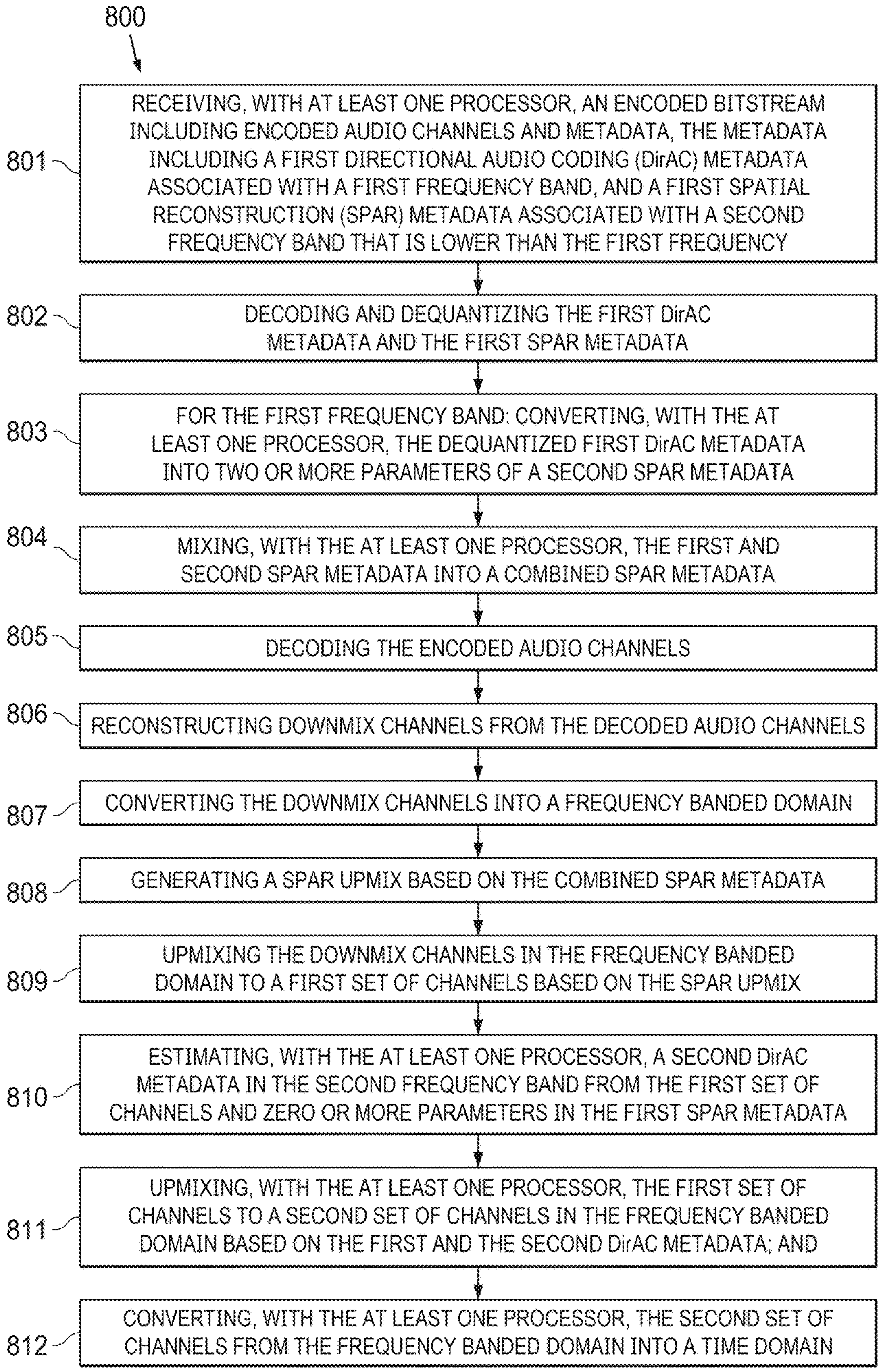
FIG. 8 is flow diagram of a process of decoding using a codec as described in reference to FIGS. 3 and 5, according to some embodiments.

FIG. 8 is a flow diagram of process 800 of decoding using a codec as described in reference to FIGS. 3 and 5 according to some embodiments. Process 800 can be implemented using the electronic device architecture described in reference to FIG. 9.

Process 800 includes: receiving an encoded bitstream including encoded audio channels and metadata, the metadata including a first directional audio coding (DirAC) metadata associated with a first frequency band, and a first spatial reconstruction (SPAR) metadata associated with a second frequency band that is lower than the first frequency band (801); decoding and dequantizing the first DirAC metadata and the first SPAR metadata (802); for the first frequency band: converting the dequantized DirAC first metadata into two or more parameters of a second SPAR metadata (803); mixing the first and second SPAR metadata into a combined SPAR metadata (804); decoding the encoded audio channels (805); reconstructing downmix channels from the decoded audio channels (806); converting the downmix channels into a frequency banded domain (807); generating a SPAR upmix based on the combined SPAR metadata (808); upmixing the downmix channels in the frequency banded domain to a first set of channels based on the SPAR upmix (809); estimating a second DirAC metadata in the second frequency band from the first set of channels and zero or more parameters in the first SPAR metadata (810); upmixing the first set of channels to a second set of channels in the frequency banded domain based on the first and the second DirAC metadata (811); and converting the second set of channels from the frequency banded domain into a time domain (812).

Example System Architecture

Figure 9:
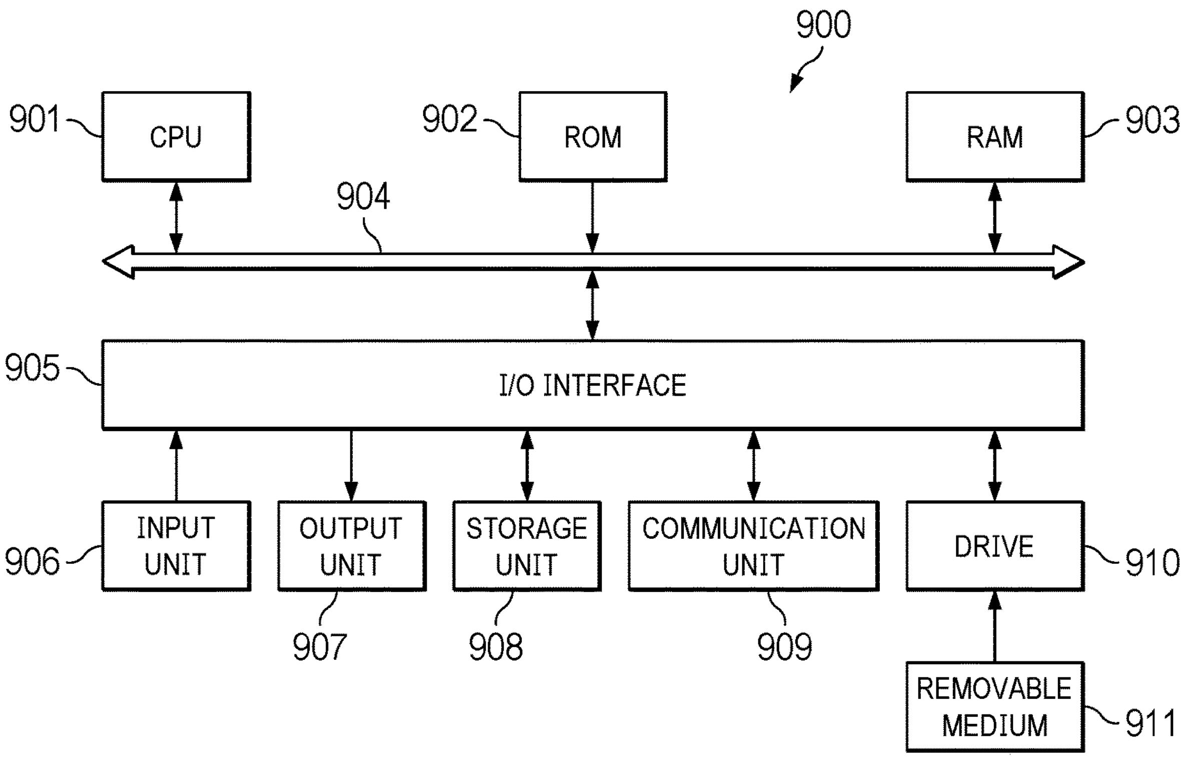
FIG. 9 is a block diagram of an example hardware architecture suitable for implementing the systems and methods described in reference to FIGS. 1-8.

FIG. 9 shows a block diagram of an example electronic device architecture 900 suitable for implementing example embodiments of the present disclosure. Architecture 900 includes but is not limited to servers and client devices, as previously described in reference to FIGS. 1-8.

As shown, the architecture 900 includes central processing unit (CPU) 901 which is capable of performing various processes in accordance with a program stored in, for example, read only memory (ROM) 902 or a program loaded from, for example, storage unit 908 to random access memory (RAM) 903. In RAM 903, the data required when CPU 901 performs the various processes is also stored, as required. CPU 901, ROM 902 and RAM 903 are connected to one another via bus 804. Input/output (I/O) interface 905 is also connected to bus 904.

The following components are connected to I/O interface 905: input unit 906, that may include a keyboard, a mouse, or the like; output unit 907 that may include a display such as a liquid crystal display (LCD) and one or more speakers; storage unit 908 including a hard disk, or another suitable storage device; and communication unit 909 including a network interface card such as a network card (e.g., wired or wireless).

In some implementations, input unit 906 includes one or more microphones in different positions (depending on the host device) enabling capture of audio signals in various formats (e.g., mono, stereo, spatial, immersive, and other suitable formats).

In some implementations, output unit 907 include systems with various number of speakers. Output unit 907 (depending on the capabilities of the host device) can render audio signals in various formats (e.g., mono, stereo, immersive, binaural, and other suitable formats).

In some embodiments, communication unit 909 is configured to communicate with other devices (e.g., via a network). Drive 910 is also connected to I/O interface 905, as required. Removable medium 911, such as a magnetic disk, an optical disk, a magneto-optical disk, a flash drive or another suitable removable medium is mounted on drive 910, so that a computer program read therefrom is installed into storage unit 908, as required. A person skilled in the art would understand that although system 900 is described as including the above-described components, in real applications, it is possible to add, remove, and/or replace some of these components and all these modifications or alteration all fall within the scope of the present disclosure.

In accordance with example embodiments of the present disclosure, the processes described above may be implemented as computer software programs or on a computer-readable storage medium. For example, embodiments of the present disclosure include a computer program product including a computer program tangibly embodied on a machine readable medium, the computer program including program code for performing methods. In such embodiments, the computer program may be downloaded and mounted from the network via the communication unit 709, and/or installed from the removable medium 911, as shown in FIG. 9.

Generally, various example embodiments of the present disclosure may be implemented in hardware or special purpose circuits (e.g., control circuitry), software, logic or any combination thereof. For example, the units discussed above can be executed by control circuitry (e.g., CPU 901 in combination with other components of FIG. 9), thus, the control circuitry may be performing the actions described in this disclosure. Some aspects may be implemented in hardware, while other aspects may be implemented in firmware or software which may be executed by a controller, microprocessor or other computing device (e.g., control circuitry). While various aspects of the example embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present disclosure include a computer program product including a computer program tangibly embodied on a machine readable medium, the computer program containing program codes configured to carry out the methods as described above.

In the context of the disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may be non-transitory and may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus that has control circuitry, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed over one or more remote computers and/or servers.

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:

receiving, with at least one processor, a multi-channel audio signal comprising a first set of channels;

for a first set of frequency bands:

computing, with the at least one processor, directional audio coding (DirAC) metadata from the first set of channels;

quantizing, with the at least one processor, the DirAC metadata;

encoding, with the at least one processor, the quantized DirAC metadata;

converting, with the at least one processor, the quantized DirAC metadata into two or more parameters of a first spatial reconstruction (SPAR) metadata;

for a second set of frequency bands that are lower than the first set of frequency bands:

computing, with the at least one processor, a second SPAR metadata from the first set of channels;

quantizing, with the at least one processor, the second SPAR metadata;

encoding, with the at least one processor, the quantized second SPAR metadata;

generating, with the at least one processor, a downmix based on the first SPAR metadata and the second SPAR metadata;

computing, with the at least one processor, frequency coefficients from the first set of channels;

downmixing, with the at least one processor, to a second set of channels from the coefficients and downmix;

encoding, with the at least one processor, the second set of channels; and storing or outputting a bitstream including the encoded second set of channels, the quantized and encoded second SPAR metadata and the quantized and encoded DirAC metadata.

2. A non-transitory computer-readable storage medium storing instructions that, when executed by a computing apparatus, cause the computing apparatus to perform the method of claim 1.

* * * * *